(12) United States Patent
Sonoda et al.

(10) Patent No.: US 9,391,916 B2
(45) Date of Patent: Jul. 12, 2016

(54) RESOURCE MANAGEMENT SYSTEM, RESOURCE MANAGEMENT METHOD, AND COMPUTER PRODUCT

(71) Applicant: FUJITSU LIMITED, Kawasaki-shi, Kanagawa (JP)

(72) Inventors: Masataka Sonoda, Kawasaki (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 332 days.

(21) Appl. No.: 14/011,033

(22) Filed: Aug. 27, 2013

(65) Prior Publication Data
US 2014/0115165 A1    Apr. 24, 2014

(30) Foreign Application Priority Data
Oct. 22, 2012    (JP) .................................. 2012-233294

(51) Int. Cl.
G06F 15/173    (2006.01)
H04L 12/911    (2013.01)
G06F 9/50      (2006.01)

(52) U.S. Cl.
CPC .............. *H04L 47/70* (2013.01); *G06F 9/5077* (2013.01); *G06F 9/5088* (2013.01); *G06F 2209/501* (2013.01)

(58) Field of Classification Search
CPC .................. H04L 67/1014; G06F 9/45533
See application file for complete search history.

(56) References Cited

U.S. PATENT DOCUMENTS

| 8,095,929 | B1* | 1/2012 | Ji ......................... | G06F 9/4856 709/223 |
| 8,549,519 | B2* | 10/2013 | Emaru .................. | G06F 3/0607 718/1 |
| 8,667,171 | B2* | 3/2014 | Guo ....................... | H04L 45/34 709/238 |
| 8,671,407 | B2* | 3/2014 | Ballani ................. | H04L 67/101 718/1 |
| 8,769,532 | B2* | 7/2014 | Sakamoto ............. | G06F 21/121 718/1 |
| 2004/0073673 | A1 | 4/2004 | Santos et al. | |
| 2009/0055507 | A1 | 2/2009 | Oeda | |
| 2009/0106409 | A1 | 4/2009 | Murata | |

(Continued)

FOREIGN PATENT DOCUMENTS

| JP | 2009-116852 | 5/2009 |
| JP | 2010-146420 | 7/2010 |

(Continued)

OTHER PUBLICATIONS

British Search Report mailed Jan. 24, 2014 in corresponding British Application No. GB1315382.0.

*Primary Examiner* — Umar Cheema
*Assistant Examiner* — Tesfu Mekonen
(74) *Attorney, Agent, or Firm* — Staas & Halsey LLP

(57) ABSTRACT

A resource management system includes a memory unit that stores therein performance information of a system; and a processor configured to refer to the performance information and determine whether a requirement for first performance information corresponding to a first system is satisfied when a function of the first system, originally implemented by using a resource of a first data center, is implemented by using a resource of a second data center, and implement the function by using a resource of the second data center, upon determining that the requirement for the first performance information is satisfied, and thereby build a configured system satisfying the requirement for the first performance information by using the resource of the first data center and the resource of the second data center.

7 Claims, 26 Drawing Sheets

(56) References Cited

U.S. PATENT DOCUMENTS

| | | | |
|---|---|---|---|
| 2010/0131948 A1* | 5/2010 | Ferris | G06F 9/50 |
| | | | 718/1 |
| 2010/0161805 A1 | 6/2010 | Yoshizawa et al. | |
| 2010/0223379 A1 | 9/2010 | Tantawi et al. | |
| 2011/0153507 A1* | 6/2011 | Murthy | G06F 9/5061 |
| | | | 705/304 |
| 2011/0153727 A1 | 6/2011 | Li | |
| 2011/0246627 A1* | 10/2011 | Kern | G06F 9/5072 |
| | | | 709/220 |
| 2011/0252135 A1 | 10/2011 | Kudo | |
| 2012/0054624 A1 | 3/2012 | Owens, Jr. et al. | |
| 2012/0191929 A1* | 7/2012 | Zietzke | G06F 9/45533 |
| | | | 711/162 |
| 2012/0260019 A1 | 10/2012 | Malaiyandisamy et al. | |
| 2013/0179550 A1* | 7/2013 | Kakizaki | G06F 15/177 |
| | | | 709/221 |
| 2014/0089510 A1* | 3/2014 | Hao | G06F 9/5072 |
| | | | 709/226 |

FOREIGN PATENT DOCUMENTS

| | | |
|---|---|---|
| JP | 2011-76470 | 4/2011 |
| JP | 2011-81579 | 4/2011 |
| JP | 2011-113268 | 6/2011 |
| JP | 2011-129117 | 6/2011 |
| JP | 2011-221581 | 11/2011 |
| JP | 2012-84129 | 4/2012 |

* cited by examiner

FIG.12

| DC IN WHICH TENANT IS BUILT | AVAILABLE RESOURCES OF BUILDING DESTINATION CANDIDATE | | | | Tx PERFORMANCE INFORMATION | | | | DIFFERENCE BETWEEN AVAILABLE RESOURCES OF CANDIDATE FOR BUILDING DESTINATION DC AND Tx PERFORMANCE INFORMATION | | | | TRANS-FER COST | |
|---|---|---|---|---|---|---|---|---|---|---|---|---|---|---|
| | NUMBER OF AVAILABLE VMs | AVAILABLE STORAGE AREA | AVAILABLE NW BANDWIDTH | TOTAL NW DELAY PERIOD | NUMBER OF VMs | VOLUME SIZE | NW BANDWIDTH | NW DELAY PERIOD | NUMBER OF VMs | VOLUME SIZE | NW BANDWIDTH | NW DELAY PERIOD | | |
| DC1 | 4 | 1 [TB] | 9 [Gbps] | 1 [ms] | 5 | 1 [TB] | 4 [Gbps] | 2 [ms] | -1 | 0 [TB] | 5 [Gbps] | 1 [ms] | 0.041 | ~1201-1 |
| DC2 | 4 | 0.8 [TB] | 9 [Gbps] | 1 [ms] | | | | | -1 | -0.2 [TB] | 5 [Gbps] | 1 [ms] | 0.241 | ~1201-2 |
| DC3 | 2 | 0.4 [TB] | 3 [Gbps] | 1 [ms] | | | | | -3 | -0.6 [TB] | -1 [Gbps] | 1 [ms] | 0.723 | ~1201-3 |
| DC1&DC2 | 8 | 1.8 [TB] | 5 [Gbps] | 7 [ms] | | | | | 3 | 0.8 [TB] | 1 [Gbps] | -5 [ms] | INFINITY | ~1201-4 |
| DC1&DC3 | 6 | 1.4 [TB] | 3 [Gbps] | 15 [ms] | | | | | 1 | 0.4 [TB] | -1 [Gbps] | -13 [ms] | INFINITY | ~1201-5 |
| DC2&DC3 | 6 | 1.2 [TB] | 3 [Gbps] | 10 [ms] | | | | | 1 | 0.2 [TB] | -1 [Gbps] | -8 [ms] | INFINITY | ~1201-6 |

EQUATION FOR CALCULATING AVAILABLE NW BANDWIDTH AND TOTAL NW DELAY PERIOD OF TENANT BUILT ACROSS MULTIPLE DCs
AVAILABLE NW BANDWIDTH=MIN(AVAILABLE NW BANDWIDTH AT EACH DC, AVAILABLE NW BANDWIDTH BETWEEN DCs) ···(1)
TOTAL NW DELAY PERIOD=Σ(NW DELAY PERIOD AT EACH DC, AVERAGE NW DELAY PERIOD BETWEEN DCs) ···(2)

TRANSFER COST=NUMBER OF INSUFFICIENT VMs*(MEMORY SIZE OF VM+VOLUME SIZE OF VM)+SIZE OF INSUFFICIENT STORAGE ···
(3)

FIG.13

| VM CANDIDATE FOR TRANSFER | CANDIDATE FOR TRANSFER DESTINATION DC | DC IN WHICH TENANT Ta IS BUILT WHEN VM IS TRANSFERRED | PRESENCE/ABSENCE OF PERFORMANCE INFORMATION VIOLATION CAUSED BY VM TRANSFER | TRANSFER COST | COST OF COMMUNICATION BETWEEN DCS AFTER VM TRANSFER | |
|---|---|---|---|---|---|---|
| Ta.VMa1 | DC2 | DC1&DC2 | ABSENT | 0.041 | 110 [Kpkts] | ~1301-1 |
| | DC3 | DC1&DC3 | PRESENT | - | - | ~1301-2 |
| Ta.VMa2 | DC2 | DC1&DC2 | ABSENT | 0.041 | 220 [Kpkts] | ~1301-3 |
| | DC3 | DC1&DC3 | PRESENT | - | - | ~1301-4 |
| Ta.VMa3 | DC2 | DC1&DC2 | ABSENT | 0.041 | 220 [Kpkts] | ~1301-5 |
| | DC3 | DC1&DC3 | PRESENT | - | - | ~1301-6 |
| Ta.VMa4 | DC2 | DC1&DC2 | ABSENT | 0.041 | 290 [Kpkts] | ~1301-7 |
| | DC3 | DC1&DC3 | PRESENT | - | - | ~1301-8 |
| Ta.VMa5 | DC2 | DC1&DC2 | ABSENT | 0.041 | 300 [Kpkts] | ~1301-9 |
| | DC3 | DC1&DC3 | PRESENT | - | - | ~1301-10 |
| Ta.VMa6 | DC2 | DC1&DC2 | ABSENT | 0.041 | 300 [Kpkts] | ~1301-11 |
| | DC3 | DC1&DC3 | PRESENT | - | - | ~1301-12 |

1301

TRANSFER VMa1 TO DC2

| VM CANDIDATE FOR TRANSFER | COMMUNICATION DESTINATION OF VM CANDIDATE FOR TRANSFER | | | | | | TOTAL COMMUNICATION VOLUME | |
|---|---|---|---|---|---|---|---|---|
| | VM a1 | VM a2 | VM a3 | VM a4 | VM a5 | VM a6 | VOLUME a1 | |
| VM a1 | | 50 | 50 | 0 | 0 | 0 | 10 | ~1302-1 |
| VM a2 | 50 | | 100 | 60 | 0 | 0 | 10 | ~1302-2 |
| VM a3 | 50 | 100 | | 60 | 0 | 0 | 10 | ~1302-3 |
| VM a4 | 0 | 60 | 60 | | 80 | 80 | 10 | ~1302-4 |
| VM a5 | 0 | 0 | 0 | 80 | | 100 | 200 | ~1302-5 |
| VM a6 | 0 | 0 | 0 | 80 | 100 | | 200 | ~1302-6 |

1302

TRANSFER COST = NUMBER OF VMs TO BE TRANSFERRED*(MEMORY SIZE OF VM+VOLUME SIZE OF VM)+SIZE OF STORAGE TO BE TRANSFERRED ···(4)

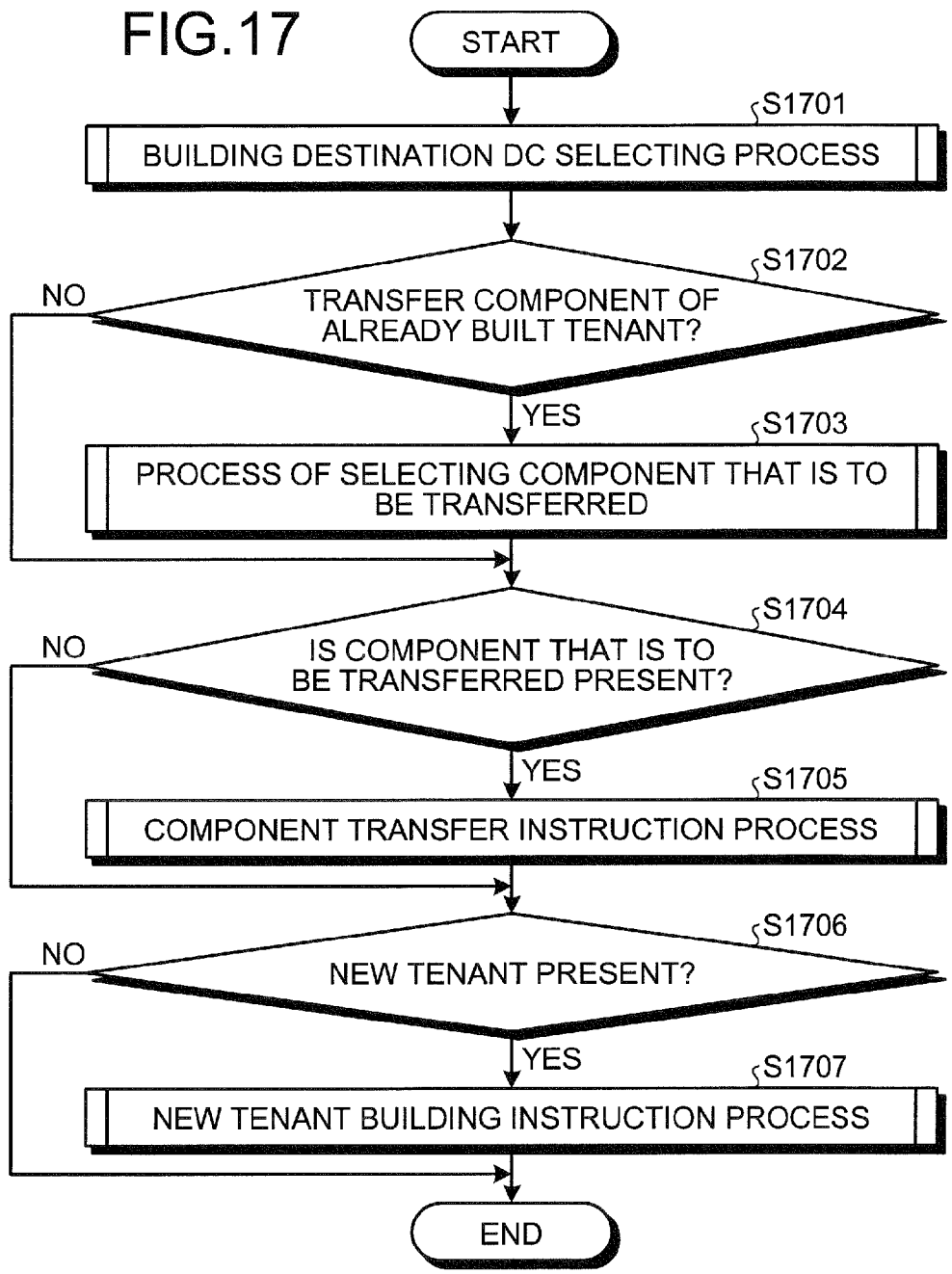

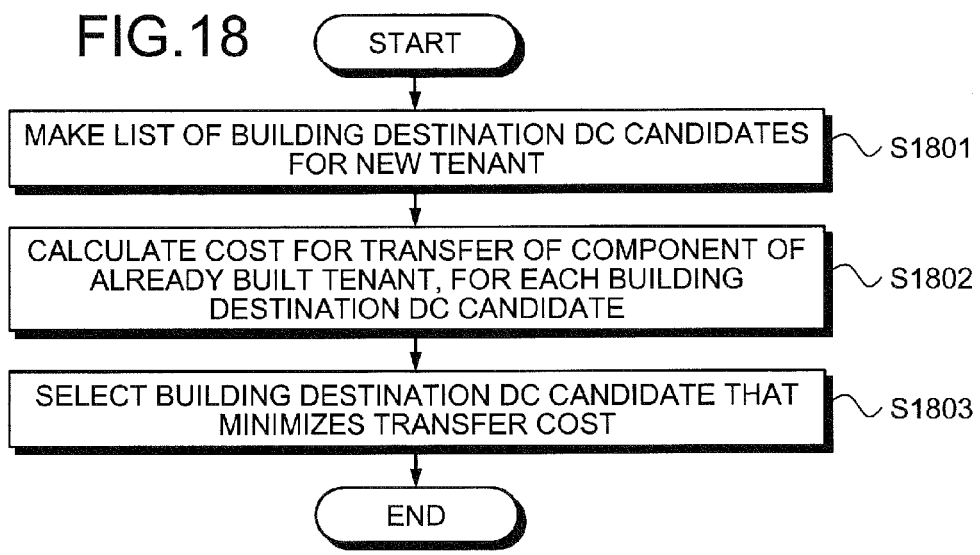
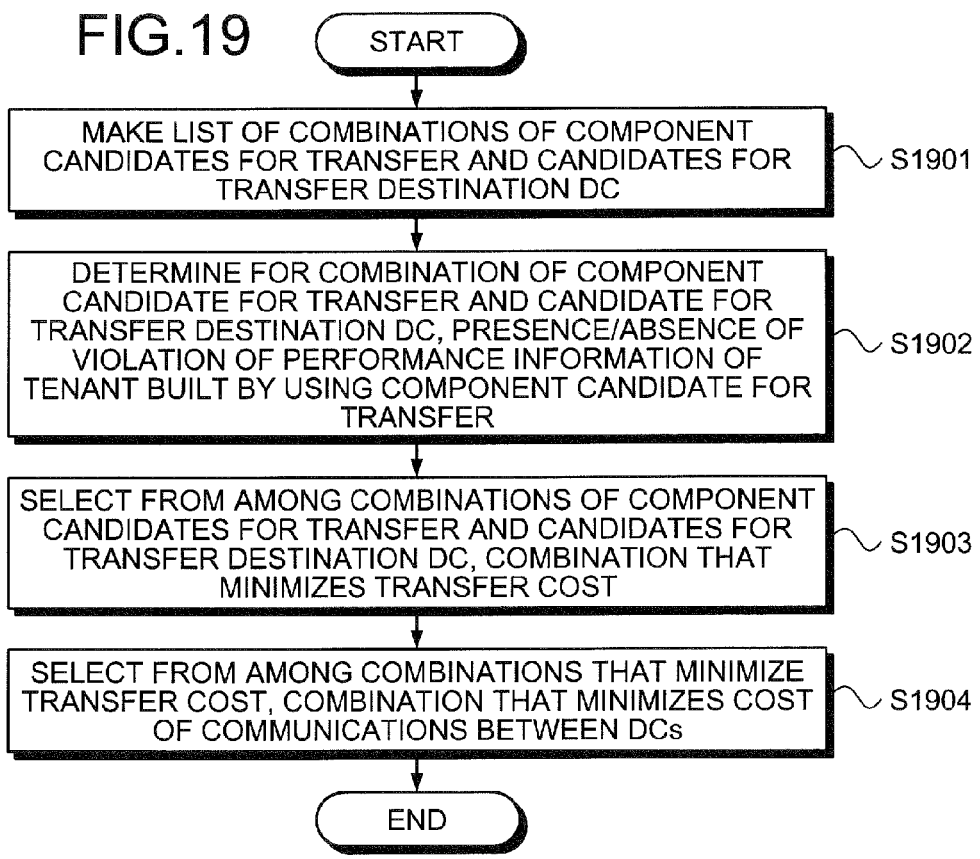

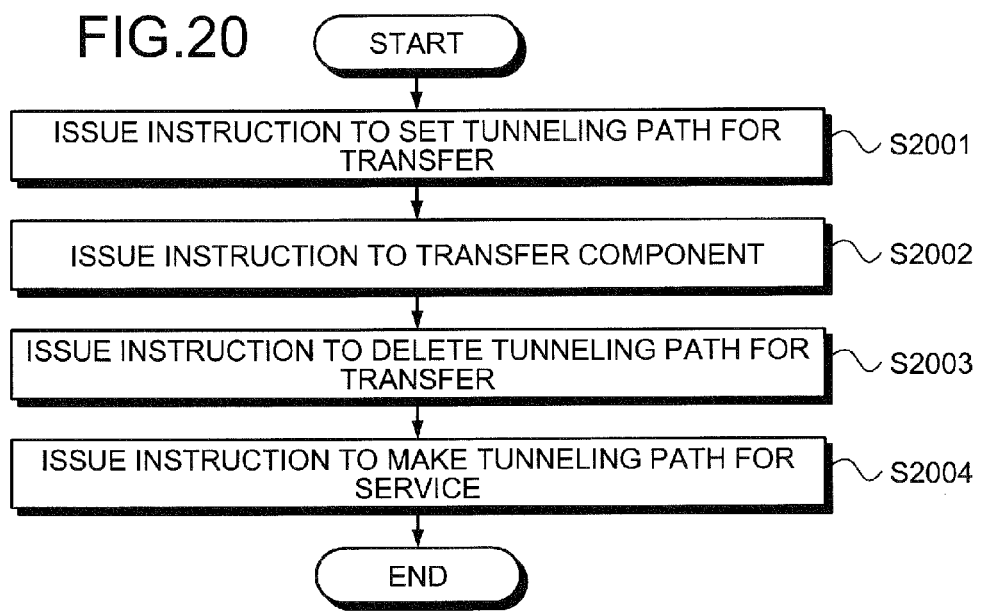
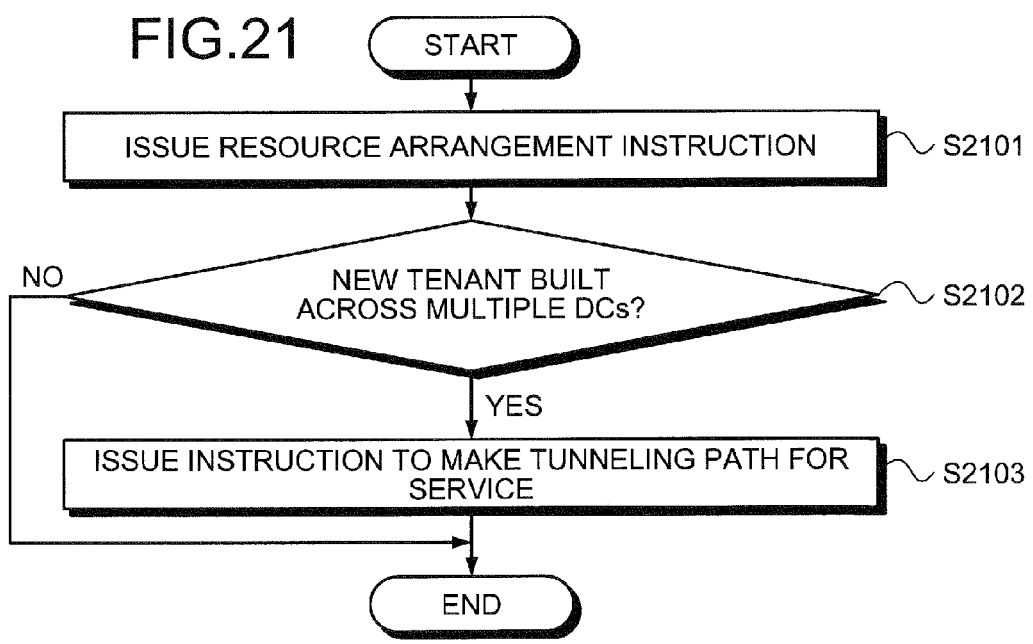

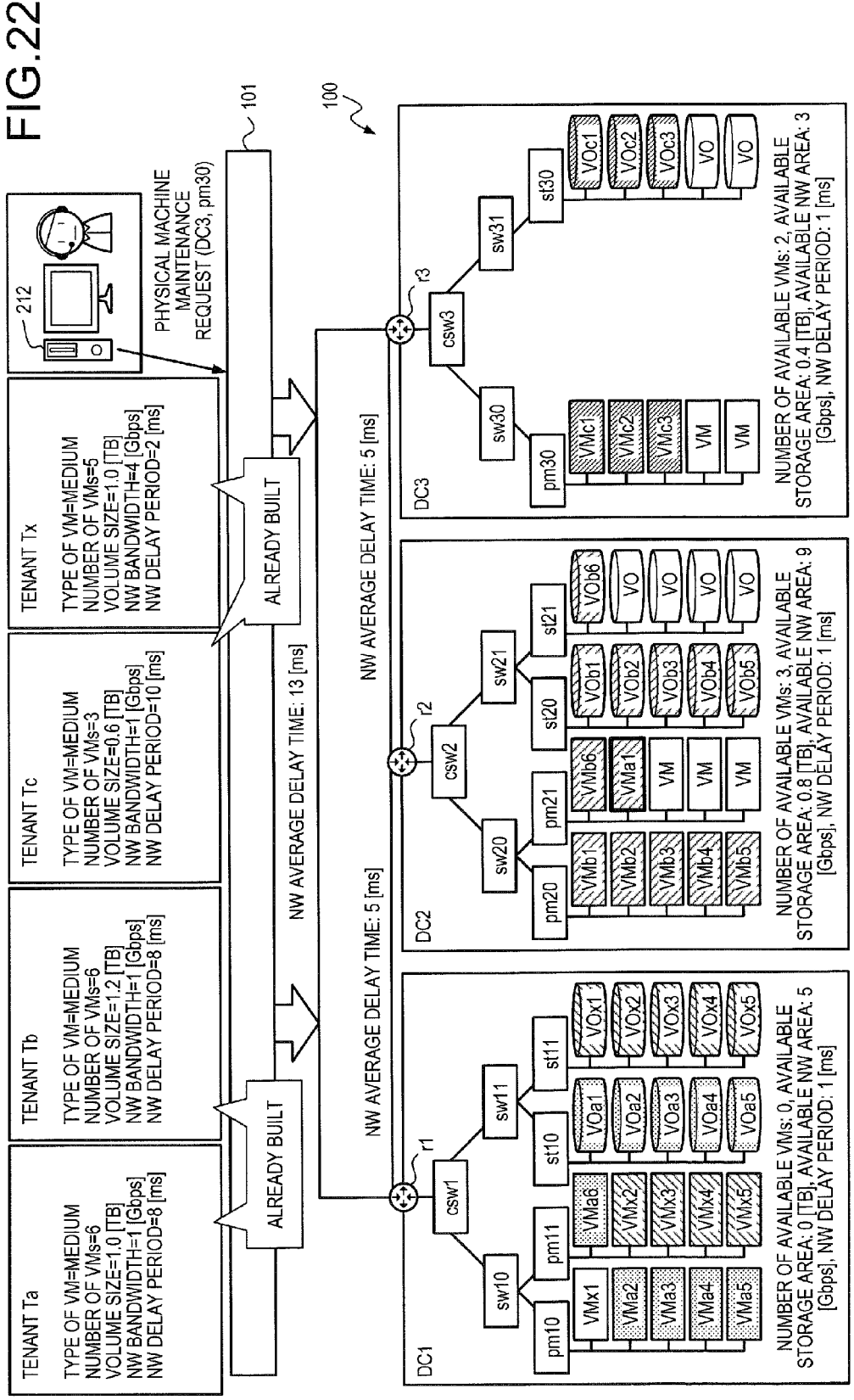

| DC IN WHICH TENANT IS BUILT | AVAILABLE RESOURCES OF BUILDING DESTINATION DC CANDIDATE | | | | Tc PERFORMANCE INFORMATION | | | | DIFFERENCE BETWEEN AVAILABLE RESOURCES OF CANDIDATE FOR BUILDING DESTINATION DC AND Tc PERFORMANCE INFORMATION | | | | TRANS-FER COST |
|---|---|---|---|---|---|---|---|---|---|---|---|---|---|
| | NUMBER OF AVAILABLE VMs | AVAILABLE STORAGE AREA | AVAILABLE NW BANDWIDTH | TOTAL NW DELAY PERIOD | NUMBER OF VMs | AVAILABLE STORAGE AREA | NW BANDWIDTH | NW DELAY PERIOD | NUMBER OF VMs | VOLUME SIZE | NW BANDWIDTH | NW DELAY PERIOD | |
| DC1 | 0 | 0 [TB] | 5 [Gbps] | 1 [ms] | 3 | 0 [TB] | 1 [Gbps] | 10 [ms] | -3 | 0 [TB] | 4 [Gbps] | 9 [ms] | 0.123 |
| DC2 | 3 | 0.8 [TB] | 9 [Gbps] | 1 [ms] | | | | | 0 | 0.8 [TB] | 8 [Gbps] | 9 [ms] | 0 |
| DC3 | 0 | 0.4 [TB] | 3 [Gbps] | 1 [ms] | | | | | -3 | -0.6 [TB] | 2 [Gbps] | 9 [ms] | 0.123 |

2401-1
2401-2
2401-3

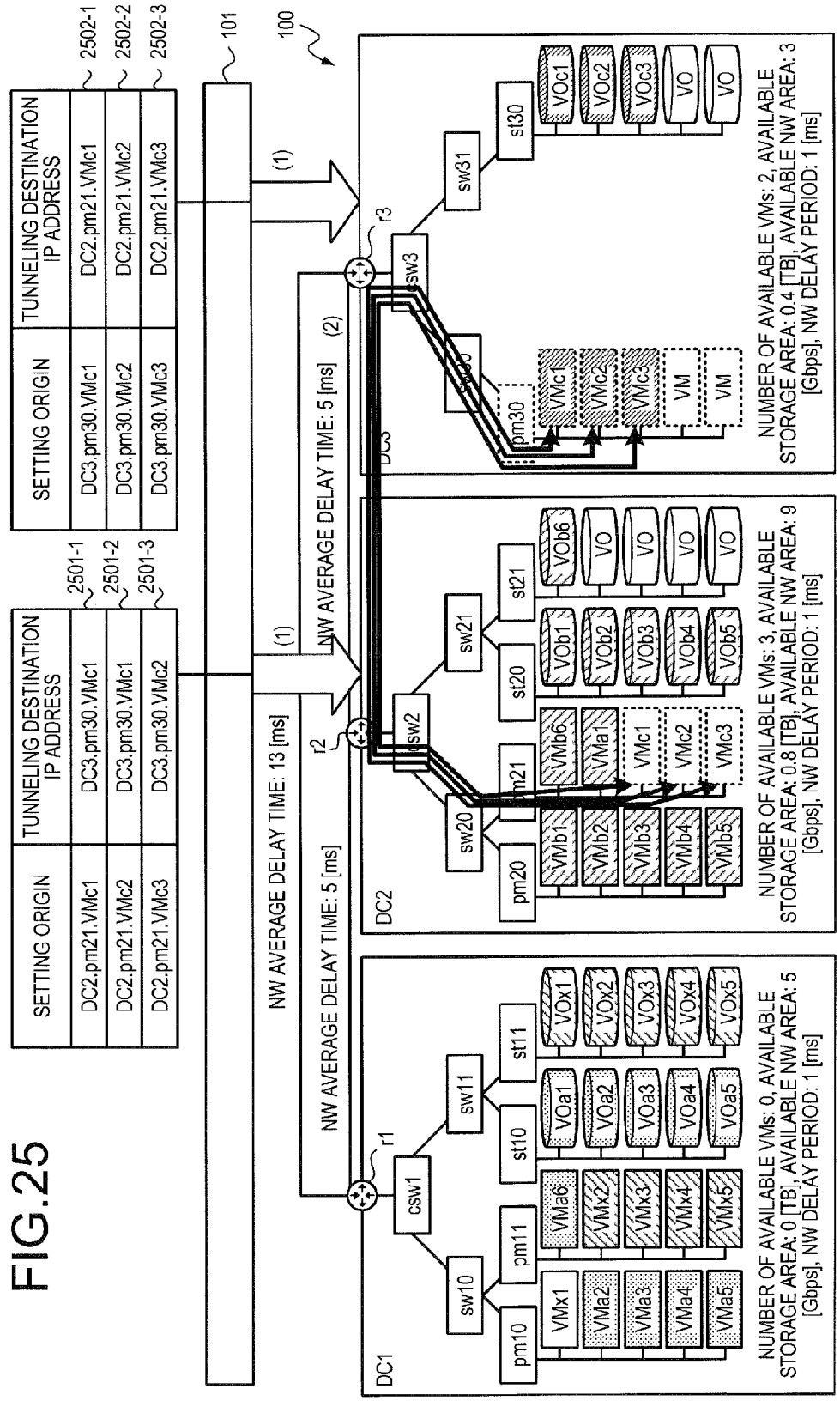

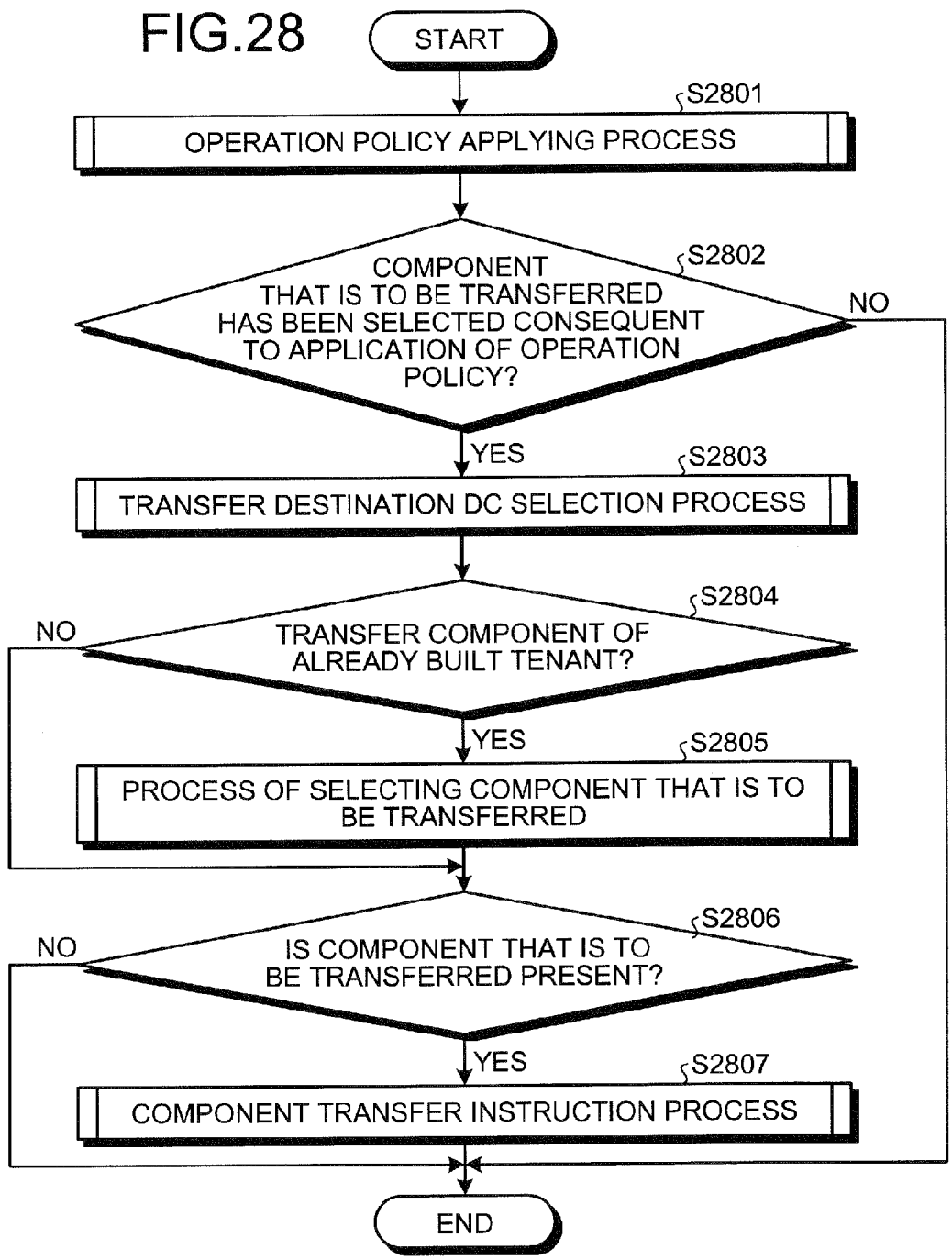

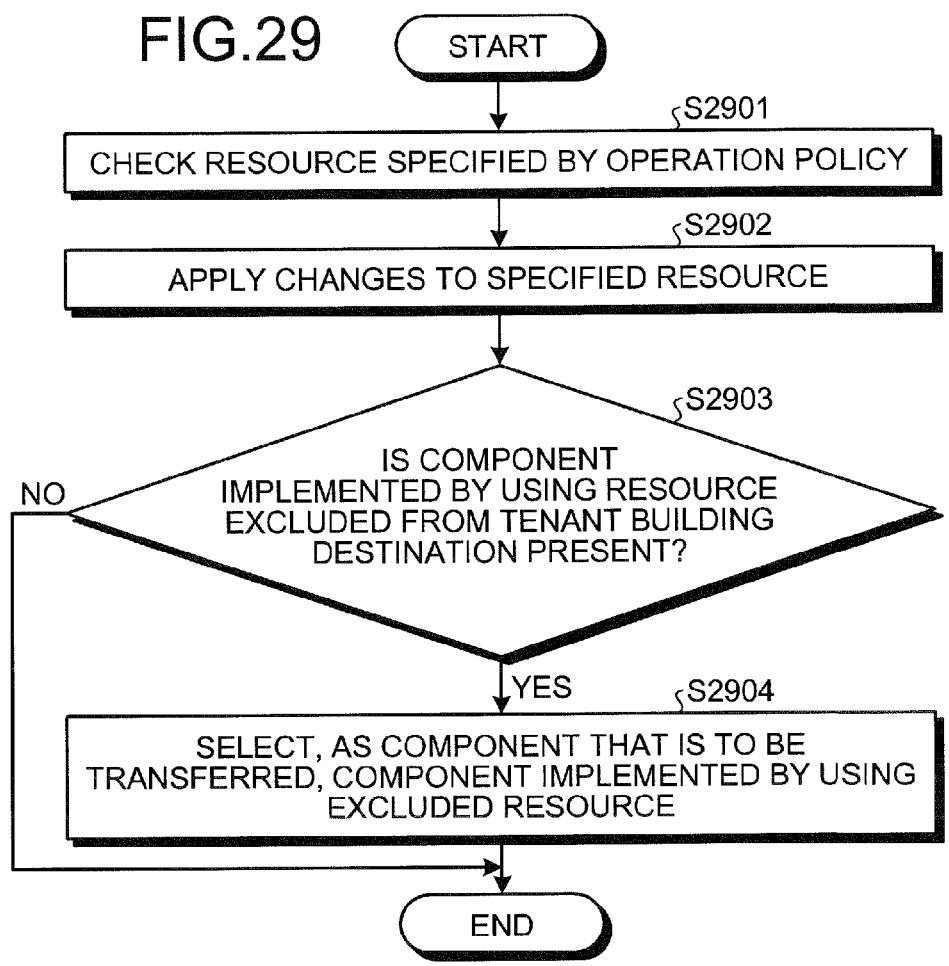

RESOURCE MANAGEMENT SYSTEM, RESOURCE MANAGEMENT METHOD, AND COMPUTER PRODUCT

CROSS REFERENCE TO RELATED APPLICATIONS

This application is based upon and claims the benefit of priority of the prior Japanese Patent Application No. 2012-233294, filed on Oct. 22, 2012, the entire contents of which are incorporated herein by reference.

FIELD

The embodiment discussed herein is related to a resource management system, a resource management method, and a resource management program.

BACKGROUND

A data center (DC) is a facility in which multiple resources, such as servers, storage devices, routers, and switches are installed. For example, at the DC, a server in the DC starts a virtual machine that executes a user application and the virtual machine executes the application. Thus, the DC provides the user with a system requested by the user.

For example, according to a known technique, with consideration of a policy for optimization and a policy dependent on applications at the DC, an application is transferred while a virtual machine on which the application runs continues to be under operation. According to another known technique, a virtual machine arrangement plan is made according to a change in a surplus resource handling policy and the amount of use of resources is simulated on the resources of a physical machine and the resources of network equipment. According to still another known technique, in a system that causes multiple servers to execute multiple virtual servers, the volume of communication between virtual servers is measured to calculate an average consumption cost based on the volume of communication when a virtual server is assigned to a different server, so that the virtual server is reassigned to a different server that cuts the average consumption cost (see, e.g., Japanese Laid-Open Patent Application Nos. 2009-116852, 2010-146420, and 2011-221581).

According to the above techniques, however, when a new system is built in the DC in response to a request from the user, a system that achieves required performance may not be built despite the presence of an available resource in the DC and consequently, the resources of the DC are not used efficiently.

SUMMARY

According to an aspect of an embodiment, a resource management system includes a memory unit that stores therein performance information of a system; and a processor configured to refer to the performance information and determine whether a requirement for first performance information corresponding to a first system is satisfied when a function of the first system, originally implemented by using a resource of a first data center, is implemented by using a resource of a second data center, and implement the function by using a resource of the second data center, upon determining that the requirement for the first performance information is satisfied, and thereby build a configured system satisfying the requirement for the first performance information by using the resource of the first data center and the resource of the second data center.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is an explanatory diagram of an example of selection of a building destination DC in a case where a new tenant build request is made;

FIG. 13 is an explanatory diagram of an example of selection of a component for transfer in a case where a new tenant build request is made;

FIG. 17 is a flowchart of an example of a resource arrangement procedure in a case where a new tenant build request is made;

FIG. 18 is a flowchart of an example of a procedure of a building destination DC selection process;

FIG. 19 is a flowchart of an example of a procedure of a process of selecting a component that is to be transferred;

FIG. 20 is a flowchart of an example of a procedure of a component transfer instruction process;

FIG. 21 is a flowchart of an example of a procedure of a new tenant building instruction process;

FIG. 22 is an explanatory diagram of an example of the state of the cloud system in a case where an operation policy setting request is made;

FIG. 24 is an explanatory diagram of an example of selection of a transfer destination DC for a tenant in a case where an operation policy setting request is made;

FIG. 25 is an explanatory diagram (1) of an example of a transfer process executed according to a selection result in a case where an operation policy setting request is made;

FIG. 28 is a flowchart of an example of a procedure of the resource arrangement process in a case where an operation policy setting request is made; and FIG. 29 is a flowchart of an example of a procedure of a process of operation policy application.

DESCRIPTION OF EMBODIMENTS

An embodiment of a resource management system, a resource management method, and a resource management program is described in detail with reference to the accompanying drawings.

Figure 1A:
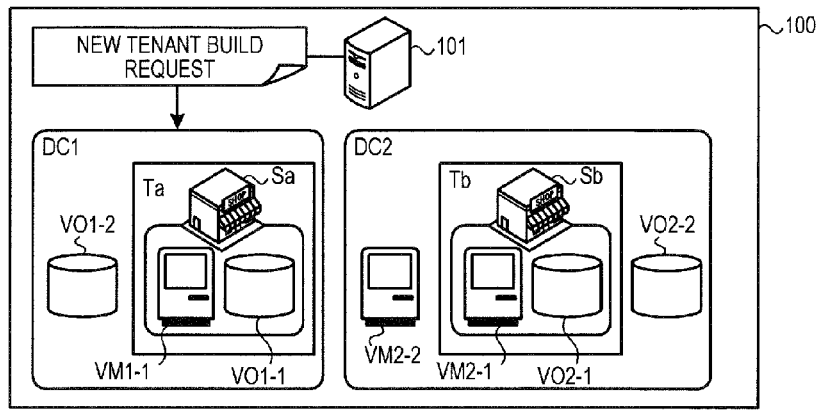
FIGS. 1A, 1B, and 1C are explanatory diagrams of an example of operation of a resource management system according to an embodiment.
Figure 1B:
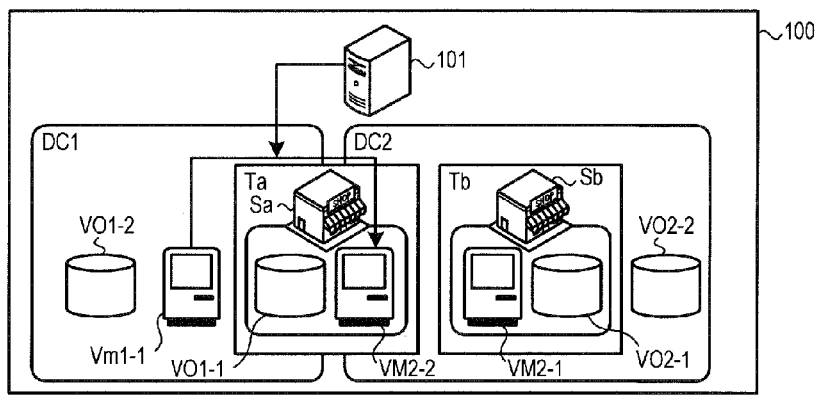
Figure 1C:
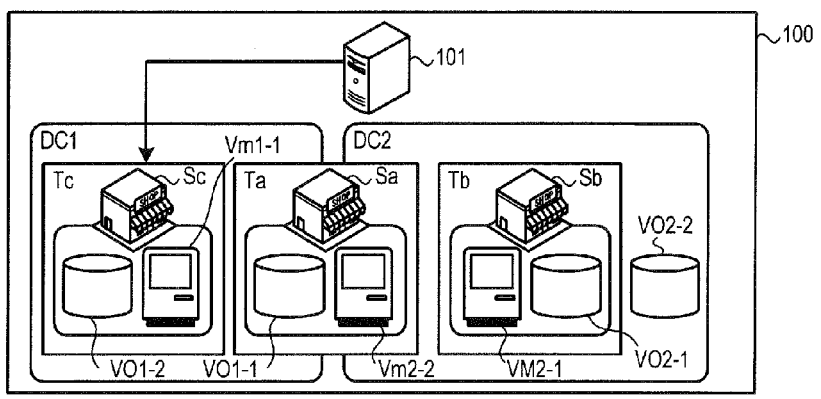

FIGS. 1A, 1B, and 1C are explanatory diagrams of an example of operation of a resource management system according to the present embodiment. A resource management system 100 is a system that includes multiple data centers (DC). The resource management system 100 builds a system that meets a request from a user, using a resource among multiple resources of the DCs, and provides the user with the built system. A resource management apparatus 101 in the resource management system 100 is a computer that controls multiple DCs.

Each DC has various computers and devices that operate data communication equipment, etc. Hereinafter, each system built in response to a request from the user will be referred to as "tenant". The DC includes resources, such as central processing units (CPUs) and storage. A component implemented by a resource of the DC offers a function of the system. Components implemented by resources of the DC include, for example, a virtual machine (VM), which is a virtual device, and a logical volume.

If the resource management apparatus 101 in the resource management system 100 cannot build a new tenant, the resource management apparatus 101 determines whether a requirement for performance information of an already built tenant is satisfied when a component implemented by using a resource of a first DC is transferred to a second DC. If the requirement for performance information of the already built tenant is satisfied, the resource management apparatus 101 transfers the component from the first DC to the second DC, and builds a new system with a component implemented by using a resource of the first DC. This operation will be described with reference to FIGS. 1A to 1C.

In FIG. 1A, the resource management system 100 includes a DC1 and a DC2. The DC1 has a VM1-1, a volume VO1-1, and a volume VO1-2, which are components of the DC1. The DC1 also has a tenant Ta composed of the VM1-1 and the volume VO1-1. In FIG. 1, services provided by tenants are depicted as drawings of stores. For example, a store Sa represents a service provided by using the VM1-1 and the volume VO1-1.

The DC2 has a VM2-1, a VM2-2, a volume VO2-1, and a volume VO2-2, which are components of the DC2. The DC2 also has a tenant Tb composed of the VM2-1 and the volume VO2-1. A store Sb represents a service provided by using the VM2-1 and the volume VO2-1. The resource management apparatus 101 stores therein performance information of the tenant Ta indicating one VM and one volume and performance information of the tenant Tb indicating one VM and one volume.

In this state, the resource management apparatus 101 request the DC1 serving as the first DC to build a new tenant Tc composed of one VM and one volume. However, the DC1 has no available VM, so that the new tenant Tc cannot be built in the DC1.

In FIG. 1B, if the new tenant Tc cannot be built, the resource management apparatus 101 refers to the performance information of the tenant Ta and determines whether a requirement for the performance information of the tenant Ta is satisfied when a component implemented by using a resource of the DC1 is transferred to the DC2 serving as the second DC. In FIG. 1B, the resource management apparatus 101 determines that if the VM1-1 in the DC1 is transferred to the VM2-2 in the DC2, the requirement for performance information of the tenant Ta indicating one VM and one volume is satisfied. Upon determining that the requirement for performance information of the tenant Ta is maintained, the resource management apparatus 101 transfers the VM1-1 to the VM2-2 in the DC2. As a result, the tenant Ta is now composed of the VM2-2 and the volume VO1-1.

In FIG. 1C, transfer of the VM1-1 to the VM2-2 in the DC2 releases the resource implementing the VM1-1. Thus, the resource management apparatus 101 builds the tenant Tc using the VM1-1 and the volume VO1-2.

A case of applying the resource management system 100 of FIGS. 1A, 1B, and 1C to a cloud system will be described.

Figure 2:
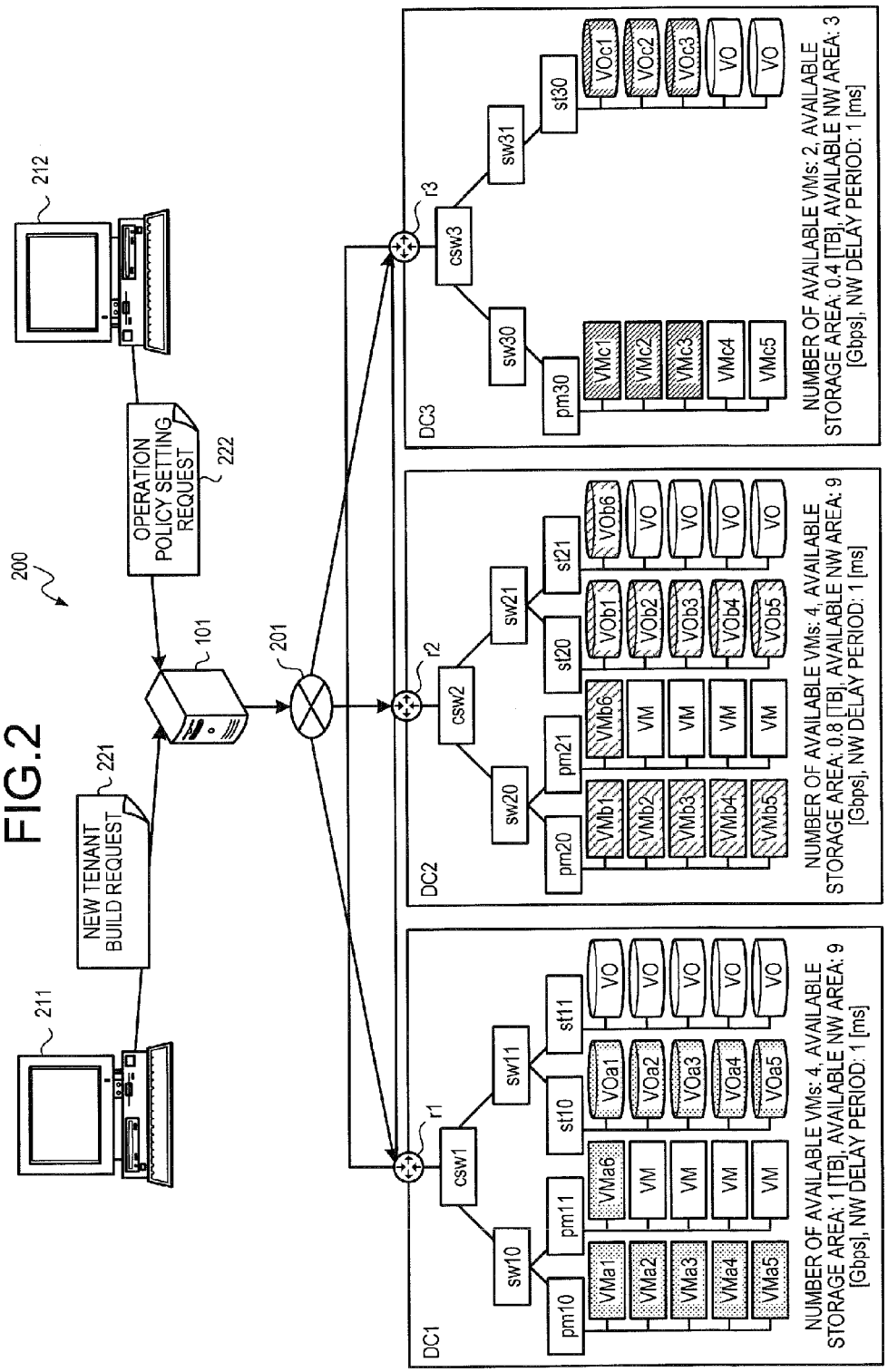
FIG. 2 is an explanatory diagram of an example of a system configuration of a cloud system.

FIG. 2 is an explanatory diagram of an example of a system configuration of a cloud system. A cloud system 200 includes the resource management apparatus 101, the DC1 to a DC3, a user terminal 211, and an administrator terminal 212. The resource management apparatus 101 is connected to each of the DC1 to DC3 via a network 201. The resource management apparatus 101 is connected also to the user terminal 211 and to the administrator terminal 212 via a network, which is not depicted in FIG. 2. The DC1 to DC3 are interconnected via routers r1, r2, and r3.

The DC1 includes the router r1, a core switch csw1, a switch sw10, a switch sw11, a physical machine pm10, a physical machine pm11, a storage device st10, and a storage device st11. A connection relation inside the DC1 will be described. The router r1 is connected to the core switch csw1, which is connected to the router r1, the switch sw10, and the switch sw11. The switch sw10 is connected to the core switch csw1, the physical machine pm10, and the physical machine pm11. The switch sw11 is connected to the core switch csw1, the storage device st10, and the storage device st11.

The DC2 includes the router r2, a core switch csw2, a switch sw20, a switch sw21, a physical machine pm20, a physical machine pm21, a storage device st20, and a storage device st21. A connection relation inside the DC2 is expressed by replacing "1x" with "2x" in the connection relation inside the DC1, and is, therefore, omitted in further description.

The DC3 includes the router r3, a core switch csw3, a switch sw30, a switch sw31, a physical machine pm30, and a storage device st30. A connection relation inside the DC3 will be described. The router r3 is connected to the core switch csw3, which is connected to the router r3, the switch sw30, and the switch sw31. The switch sw30 is connected to the core switch csw3 and the physical machine pm30. The switch sw31 is connected to the core switch csw3 and the storage device st30.

The routers r1 to r3 are devices that interconnect networks. Hereinafter, a network may be abbreviated simply as "NW". The switches sw10 to sw31 are devices having a packet exchanging function. The core switch is one type of a switch, serving as a device that transfers or relays data in a core network.

Each of the physical machines pm10 to pm30 can execute five VMs. Each of the storage devices st10 to st30 can generate five volumes VO each having a memory capacity of 200 [GB]. Hereinafter, a component making up a tenant is expressed by appending a reference numeral for the tenant to the rear of a reference numeral for the component. For example, the first VM making up the tenant Ta is denoted as VMa1.

The resource management apparatus 101 builds three tenants Ta, Tb, and Tc in the cloud system 200. The tenant Ta is composed of VMa1 to VMa5 of the physical machine pm10 and volumes VOa1 to VOa5 of the storage device st10. The tenant Tb is composed of VMb1 to VMb5 of the physical machine pm20, a VMb6 of the physical machine pm21, volumes VOb1 to VOb5 of the storage device st20, and a volume VOb6 of the storage device st21. The tenant Tc is composed of VMc1 to VMc3 of the physical machine pm30 and volumes VOc1 to Voc3 of the storage device st30.

The user terminal 211 is the terminal operated by the user. The user terminal 211 operated by the user transmits a new tenant build request 221 to the resource management apparatus 101. A specific example of the new tenant build request 221 will be described later with reference to FIG. 6. The administrator terminal 212 is the terminal operated by an administrator of the cloud system 200. The administrator terminal 212 operated by the administrator transmits an operation policy setting request 222 to the resource management apparatus 101. A specific example of the operation policy setting request 222 will be described later with reference to FIG. 9.

Figure 3:
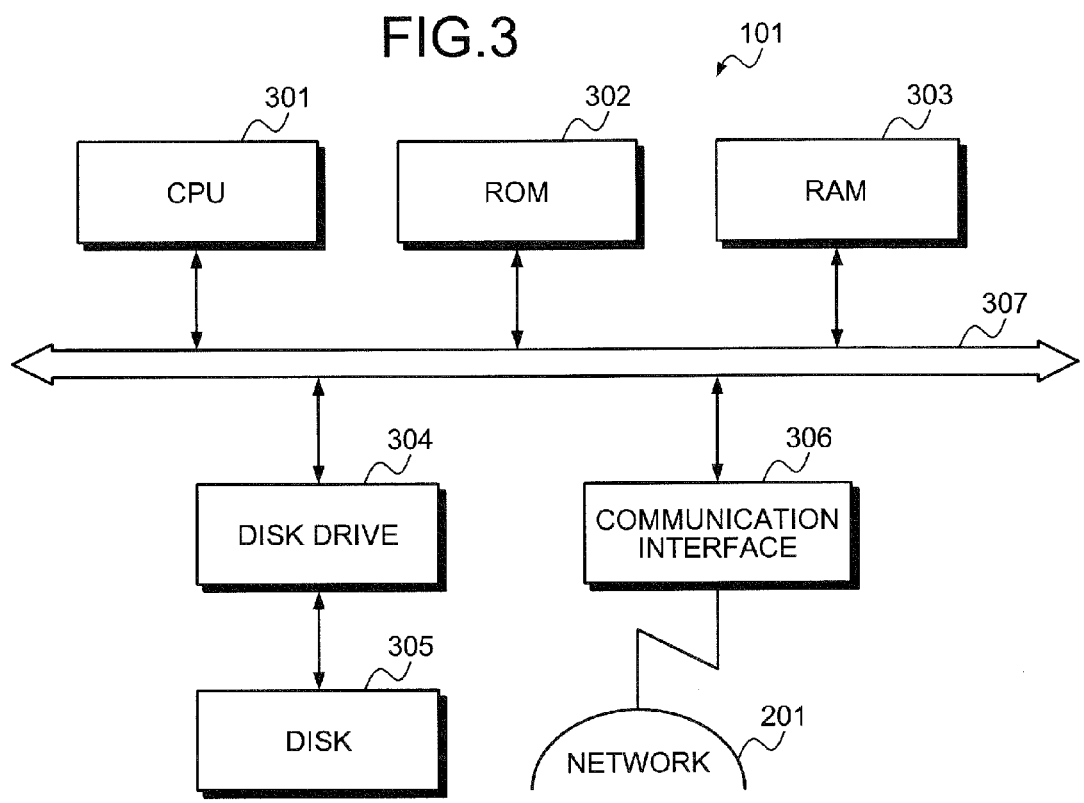
FIG. 3 is a block diagram of an example of a hardware configuration of a resource management apparatus.

FIG. 3 is a block diagram of an example of a hardware configuration of the resource management apparatus. In FIG. 3, the resource management apparatus 101 includes a CPU 301, a read-only memory (ROM) 302, and a random access memory (RAM) 303. The resource management apparatus 101 further includes a disk drive 304, a disk 305, and a communication interface 306. The CPU 301 to the communication interface 306 are interconnected via bus 307. Although not depicted in FIG. 3, each of the routers r1 to r3, the core switches csw1 to csw3, the switches sw10 to sw31, the physical machines pm10 to pm30, and the storage devices st10 to st30 also have the same hardware as the resource management apparatus 101.

The CPU 301 is a processing unit that supervises overall control over the resource management apparatus 101. The ROM 302 is a nonvolatile memory that stores therein programs, such as a boot program. The RAM 303 is a volatile memory used as a work area for the CPU 301.

The disk drive 304 is a controller that under the control of the CPU 301, controls the reading and the writing of data with respect to the disk 305. The disk drive 304 may be provided as, for example, a magnetic disk drive, a solid-state drive, etc. The disk 305 is a nonvolatile memory that saves data written thereto under the control of the disk drive 304. For example, when the disk drive 304 is a magnetic disk drive, the disk 305 may be provided as a magnetic disk. When the disk drive 304 is a solid-state drive, the disk 305 may be provided as a semiconductor element memory.

The communication interface 306 is a controller that supervises interface between the NW 201 and the interior of the resource management apparatus 101 to control the input and output of data with respect to an external apparatus. For example, the communication interface 306 is connected to a local area network (LAN), a wide area network (WAN), or the Internet that serves as the NW 201, via a communication line, and is connected to an external apparatus via the NW 210. The communication interface 306 may be provided as, for example, a modem, a LAN adaptor, etc. The resource management apparatus 101 may have an optical disk drive, an optical disk, keyboard, and a mouse. The user terminal 211 and the administrator terminal 212 may each have an optical disk drive, an optical disk, keyboard, and a mouse.

Figure 4:
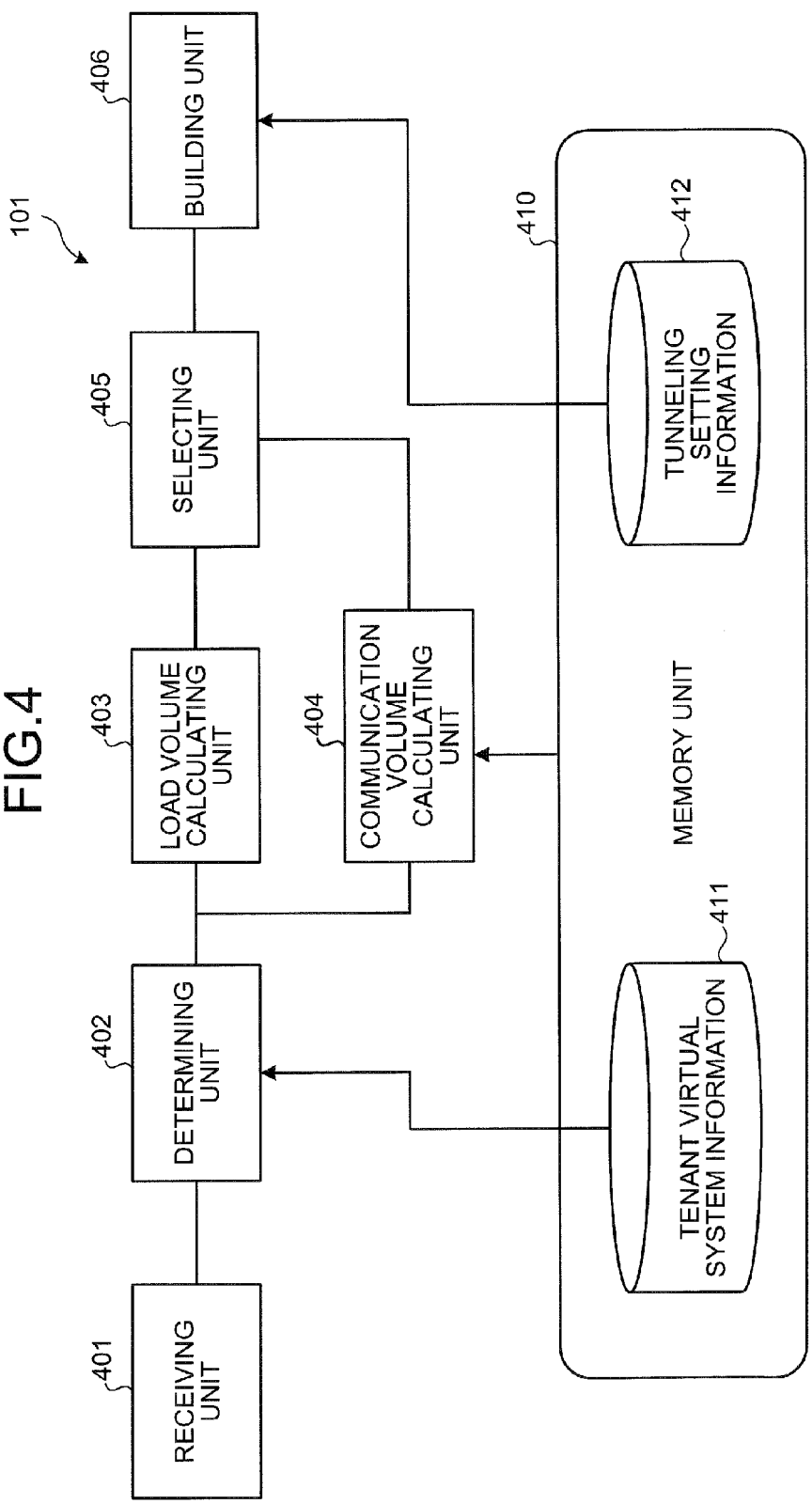
FIG. 4 is a block diagram of an example of a functional configuration of the resource management apparatus.

Functions of the resource management apparatus 101 will be described. FIG. 4 is a block diagram of an example of a functional configuration of the resource management apparatus. The resource management apparatus 101 includes a receiving unit 401, a determining unit 402, a load volume calculating unit 403, a communication volume calculating unit 404, a selecting unit 405, and a building unit 406. Functions of the receiving unit 401 to building unit 406, which serve as a control unit, are implemented when the CPU 301 executes a program stored in a memory device. A memory device is, for example, the ROM 302, the RAM 303, the disk 305, etc.

The resource management apparatus 101 can access a memory unit 410, which is stored in a memory device, such as the RAM 303 and the disk 305. The memory unit 410 stores therein tenant performance information that corresponds to a request from the user and includes tenant virtual system information 411 and tunneling setting information 412. The memory unit 410 may store therein the volume of communications made between multiple components. An example of the contents of the tenant virtual system information 411 will be described later with reference to FIG. 5. An example of the contents of the tunneling setting information 412 will be described later with reference to FIG. 8.

The receiving unit 401 receives the new tenant build request 221 from the user terminal 211, and receives the operation policy setting request 222 from the administrator terminal 212. The received new tenant build request 221 and operation policy setting request 222 are stored to a memory area, such as the RAM 303 and the disk 305.

The determining unit 402 refers to the performance information stored in the memory unit 410 and determines whether a requirement for the first performance information corresponding to a first tenant is satisfied if some of the functions of the first tenant originally implemented by using a resource of the first DC are implemented by using a resource of the second DC. The determining unit 402 may make such a determination if the receiving unit 401 receives the new tenant build request 221 and a new tenant cannot be built in any one of multiple DCs. The determining unit 402 may make such a determination if the receiving unit 401 receives the operation policy setting request 222 and a new tenant cannot be built in any one of multiple DCs because a resource becomes unavailable there. The result of the determination is stored to a memory area, such as the RAM 303 and the disk 305.

In a specific case, the load volume calculating unit 403 calculates the load of a process of transferring a first component to the second DC and the load of a process of transferring a second component to the second DC. The case mentioned above is a case where the determining unit 402 determines that a requirement for the first performance information is satisfied when the first component or second component that is implemented by using a resource of the first DC, is transferred to the second DC. The load volume may be calculated, for example, based on the size of data to be transferred. An example of calculation of a load volume will be described later with reference to FIG. 12.

If it is determined that a requirement for the first performance information is satisfied when a component selected by the selecting unit 405 is transferred to the third DC different from the second DC, the load volume calculating unit 403 may calculate the load for transferring the selected component to the third DC.

In a specific case, the load volume calculating unit 403 may calculate the load for a process of transferring a component to the second DC and the load for a process of transferring a component to the third DC. The case mentioned above is a case where the determining unit 402 determines that a requirement for the first performance information is satisfied if a component that is implemented by using a resource of the first DC, is transferred to the second DC or third DC.

If it is determined that a requirement for the first performance information is satisfied when a different component that is different from a component implemented by using a resource of the first DC is transferred to a transfer destination DC, the load volume calculating unit 403 may calculate the load for a process of transferring the different component to the transfer destination DC. The calculated load volume is stored to a memory area, such as the RAM 303 and the disk 305.

Based on a communication volume stored in the memory unit 410, the communication volume calculating unit 404 calculates the volume of communications made between the first DC and the second DC after transfer of the first component to the second DC. The communication volume calculating unit 404 also calculates the volume of communications made between the first DC and the second DC after transfer of the second component to the second DC. An example of calculation of a communication volume will be described later with reference to FIG. 13. The calculated communication volume is stored to a memory area, such as the RAM 303 and the disk 305.

The selecting unit 405 selects a component that is to be transferred from the first DC to the second DC, from among the first and second components, based on a calculation result from the load volume calculating unit 403. For example, it is assumed that the load for the process of transferring the first component to the second DC is calculated at a transfer data size of 30 [MB] and that the load for the process of transferring the second component to the second DC is calculated at a transfer data size of 20 [MB]. In this case, the selecting unit 405 selects the second component requiring less load volume, as the component that is to be transferred.

The selecting unit 405 may select a transfer destination DC to which a component is transferred, out of the second and third DCs, based on a calculation result from the load volume calculating unit 403. The selecting unit 405 may select a component that is to be transferred from the first DC to the second DC, from among the first and second components, based on a calculation result from the communication volume calculating unit 404. The selecting unit 405 may select a transfer destination DC to which a component is transferred, from among the second and third DCs, based on a calculation result from the load volume calculating unit 403. The selecting unit 405 may select a component that is to be transferred to the transfer destination DC, from among a component and a different component, based on a calculation result from the load volume calculating unit 403. The calculated communication volume is stored to a memory area, such as the RAM 303 and the disk 305.

If the determining unit 402 determines that a requirement for the performance information is satisfied, the building unit 406 realizes some functions using a resource of the second DC and thereby, builds a configured tenant satisfying a requirement for the first performance information, by using a resource of the first DC and a resource of the second DC. The configured tenant means a newly configured tenant. For example, the building unit 406 makes the tunneling setting information 412 for communication, transfers a component from the first DC to the second DC, and builds a new tenant using a component implemented by utilizing a resource left available in the first DC. If a new tenant uses resources of two or more DCs, the building unit 406 makes the tunneling setting information 412 for service.

The building unit 406 may realize a component selected for transfer by the selecting unit 405, using a resource of the second DC to thereby, build a configured tenant satisfying a requirement for the first performance information by using a resource of the first DC and the resource of the second DC. Using a resource of a transfer destination DC selected by the selecting unit 405, the building unit 406 may realize a component that is to be transferred to thereby build a configured tenant satisfying a requirement for the first performance information by using a resource of the first DC and the resource of the transfer destination DC. The building unit 406 may realize a component using a resource of a transfer destination DC selected by the selecting unit 405 to thereby build a configured tenant satisfying a requirement for the first performance information, by using a resource of the first DC and the resource of the transfer destination DC. Using a resource of a transfer destination DC, the building unit 406 may realize a component selected for transfer by the selecting unit 405 to thereby build a configured tenant satisfying a requirement for the first performance information by using a resource of the first DC and the resource of the transfer destination DC.

Figure 5:
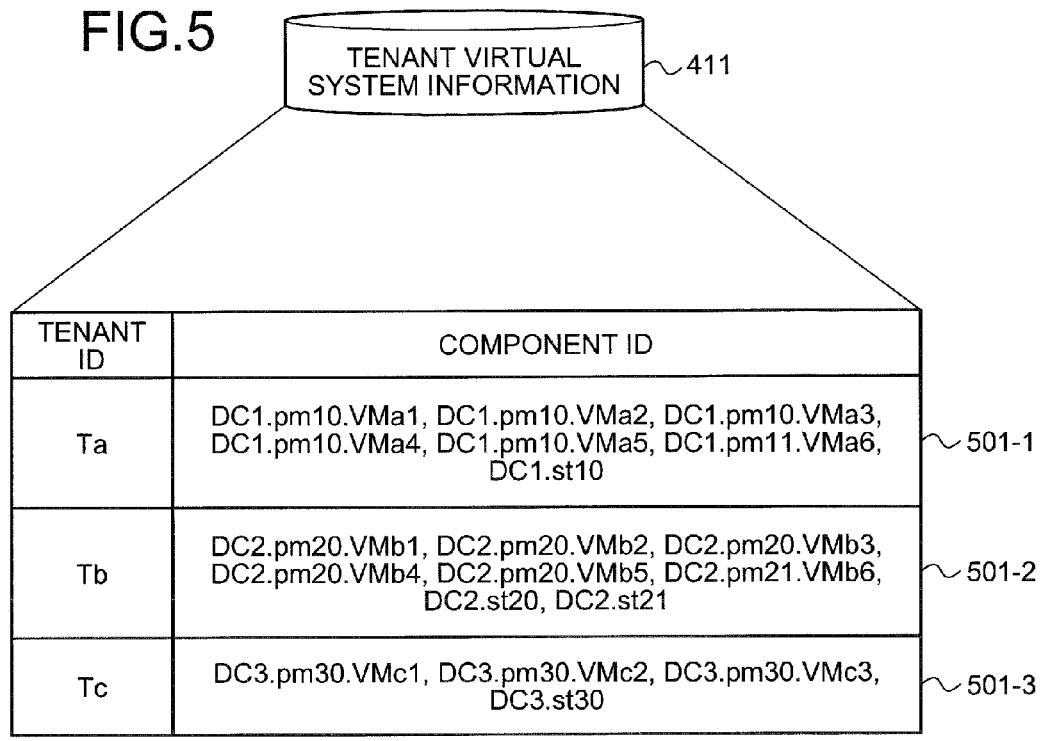
FIG. 5 is an explanatory diagram of an example of the contents of tenant virtual system information.

FIG. 5 is an explanatory diagram of an example of the contents of tenant virtual system information. Tenant virtual system information 411 of FIG. 5 has records 501-1 to 501-3. The tenant virtual system information 411 has two fields of "tenant ID" and "component ID". The "tenant ID" field stores therein identification information for uniquely identifying a tenant. The "component ID" field stores therein identification information for identifying a component with which a tenant is built.

For example, the record 501-1 indicates that a tenant identified by a tenant ID Ta is built using the VMa1 to VMa5 of the physical machine pm10 in the DC1, the VMa6 of the physical machine pm11 in the DC1, and the storage device st10 in the DC1.

Figure 6:
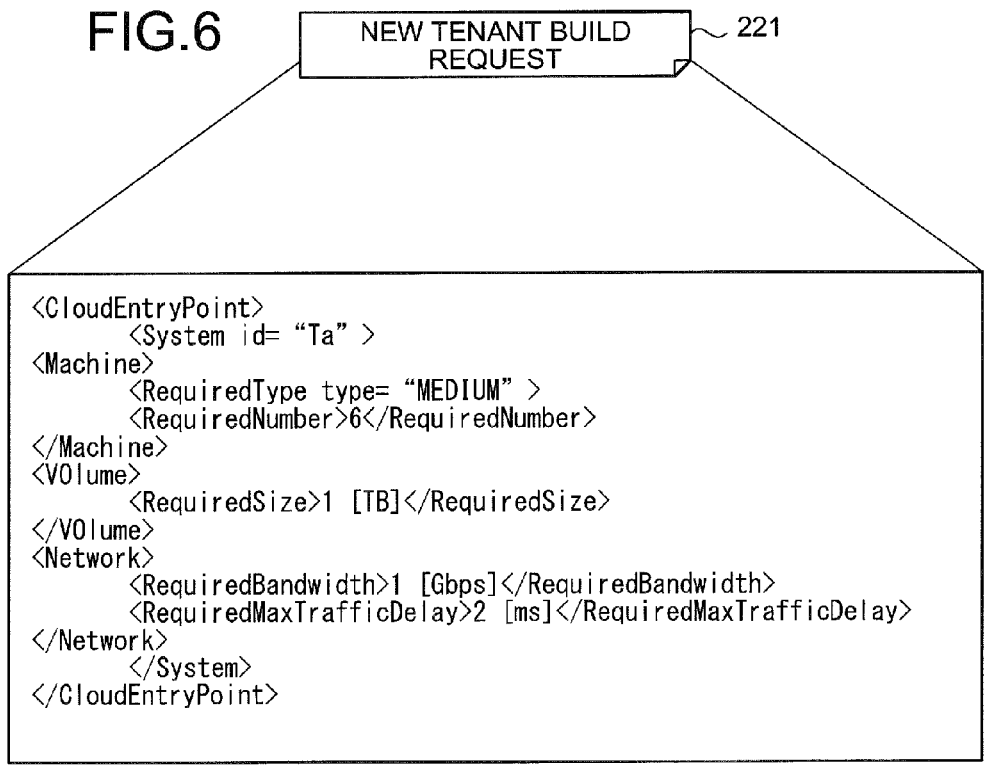
FIG. 6 is an explanatory diagram of an example of a message of a new tenant build request.

FIG. 6 is an explanatory diagram of an example of a message of a new tenant build request. The message of the new tenant build request 221 depicted in FIG. 6 is written in the extensible markup language (XML). The message of the new tenant build request 221 carries performance information requested by a virtual system.

Here, the performance information carried by the message of the new tenant build request 221 depicted in FIG. 6 will be described. The type of a VM, which is performance information, is described in a <RequiredType> tag in a <machine> tag. The type of a VM represents the processing capacity of one VM. For example, when the type of a VM is set to a large value, the number of CPUs that execute the VM is large. The number of VMs, which is performance information, is indicated in a <RequiredNumber> tag in the <machine> tag.

A volume size adopted by a VM, which is performance information, is indicated in a <RequiredSize> tag in a <Volume> tag. An NW bandwidth, which is performance information, is indicated in a <RequiredBandwidth> tag in a <Network> tag. A NW delay period, which is performance information, is indicated in a <RequiredMaxTrafficDelay> tag.

Figure 7:
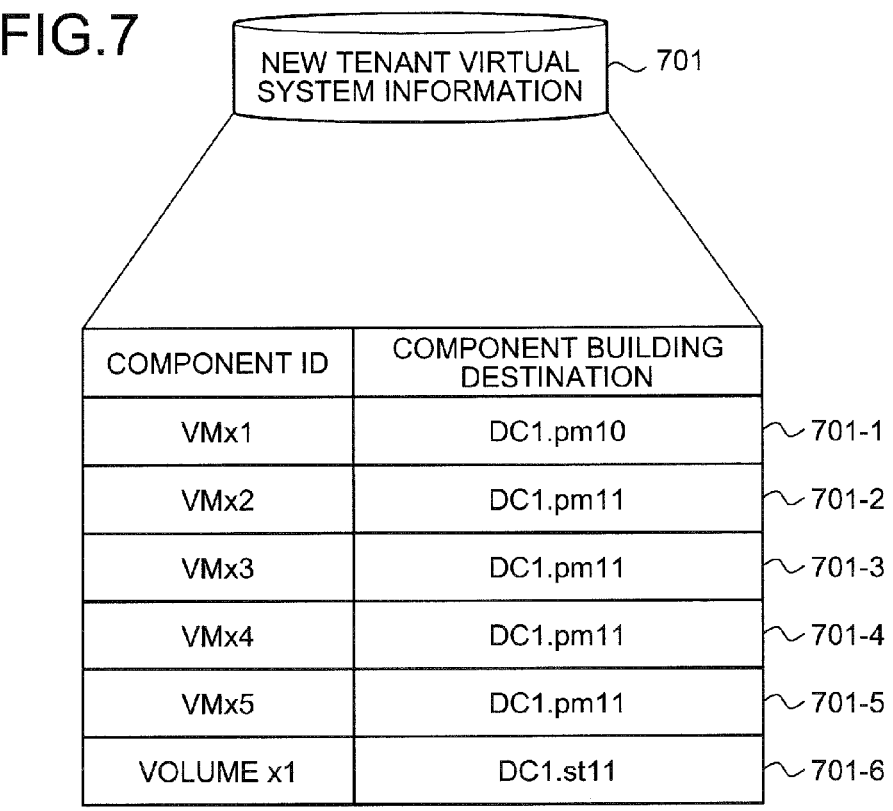
FIG. 7 is an explanatory diagram of an example of the contents of new tenant virtual system information.

FIG. 7 is an explanatory diagram of an example of the contents of new tenant virtual system information. New tenant virtual system information 701 carries the contents as a list of components making up a virtual system for a new tenant of which building is requested. The new tenant virtual system information 701 depicted in FIG. 7 has records 701-1 to 701-6.

The new tenant virtual system information 701 has two fields of "component ID" and "component building destination". The "component ID" field stores therein identification information of a component making up a virtual system built for a new tenant. The "component building destination" field stores therein identification information of a resource that realizes a component to build.

For example, the record 701-1 indicates that a VM of a virtual system built for a new tenant, the VM being identified by a component ID of VMx1, is in the machine pm10 in the DC1. The record 701-6 indicates that a volume of the virtual system built for the new tenant, the volume being identified by a component ID of volume x1, is secured in storage connected to the storage device st11 in the DC1.

Figure 8:
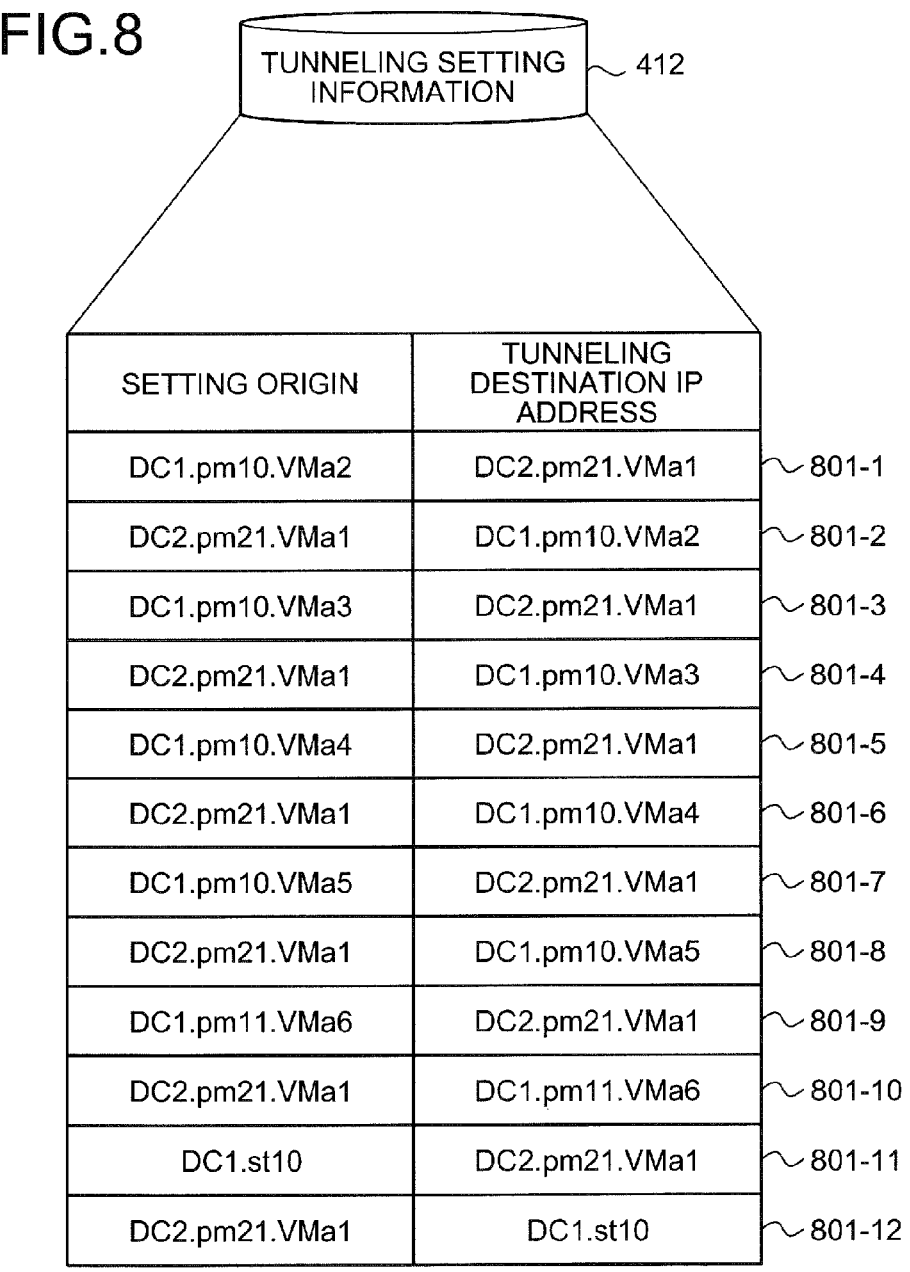
FIG. 8 is an explanatory diagram of an example of the contents of tunneling setting information.

FIG. 8 is an explanatory diagram of an example of the contents of tunneling setting information. The tunneling setting information 412 is set for communication that is made when a component is transferred or for service communication that is made when a virtual system is built using multiple DCs. The tunneling setting information 412 of FIG. 8 has records 801-1 to 801-12.

The tunneling setting information 412 has two fields of "setting origin" and "tunneling destination Internet Protocol (IP) address". The "setting origin" field stores therein identification information of a component for which the tunneling setting information 412 is set. Identification information of a component may be provided as an IP address that is assigned to the component so that it is uniquely identified. The "tunneling destination IP address" field stores therein the IP address of a component that is a communication counterpart, which is regarded as a different segment.

For example, the record 801-1 indicates that a tunneling path connecting the VMa2 of the physical machine pm10 in the DC1 to the VMa1 of the physical machine pm21 in the DC2, the VMa1 being a different segment to the VMa2, is set for data transmission from VMa2 to the VMa1. The record 801-2 indicates that a tunneling path connecting the VMa1 of the physical machine pm21 in the DC2 to the VMa2 of the physical machine pm10 in the DC1, the VMa2 being a different segment to the VMa1, is set for data transmission from VMa1 to the VMa2.

Figure 9:
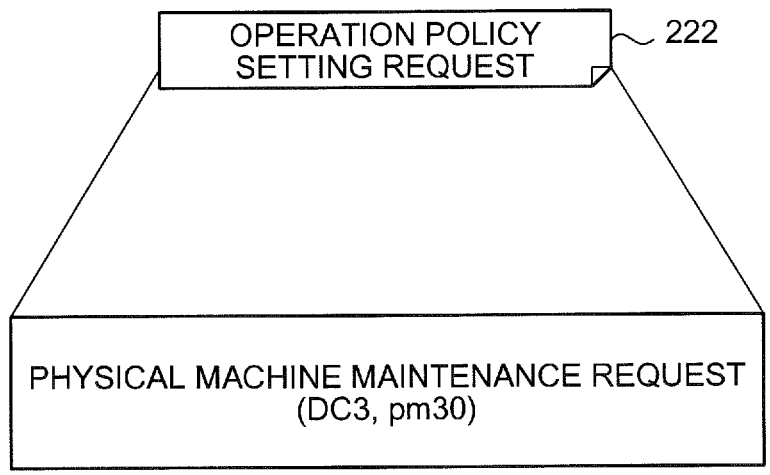
FIG. 9 is an explanatory diagram of an example of an operation policy setting request.

FIG. 9 is an explanatory diagram of an example of an operation policy setting request. The operation policy setting request 222 is issued from the administrator terminal 212 operated by the system administrator. The operation policy setting request 222 depicted in FIG. 9 represents a request for maintenance of the physical machine pm30 in the DC3.

Figure 10:
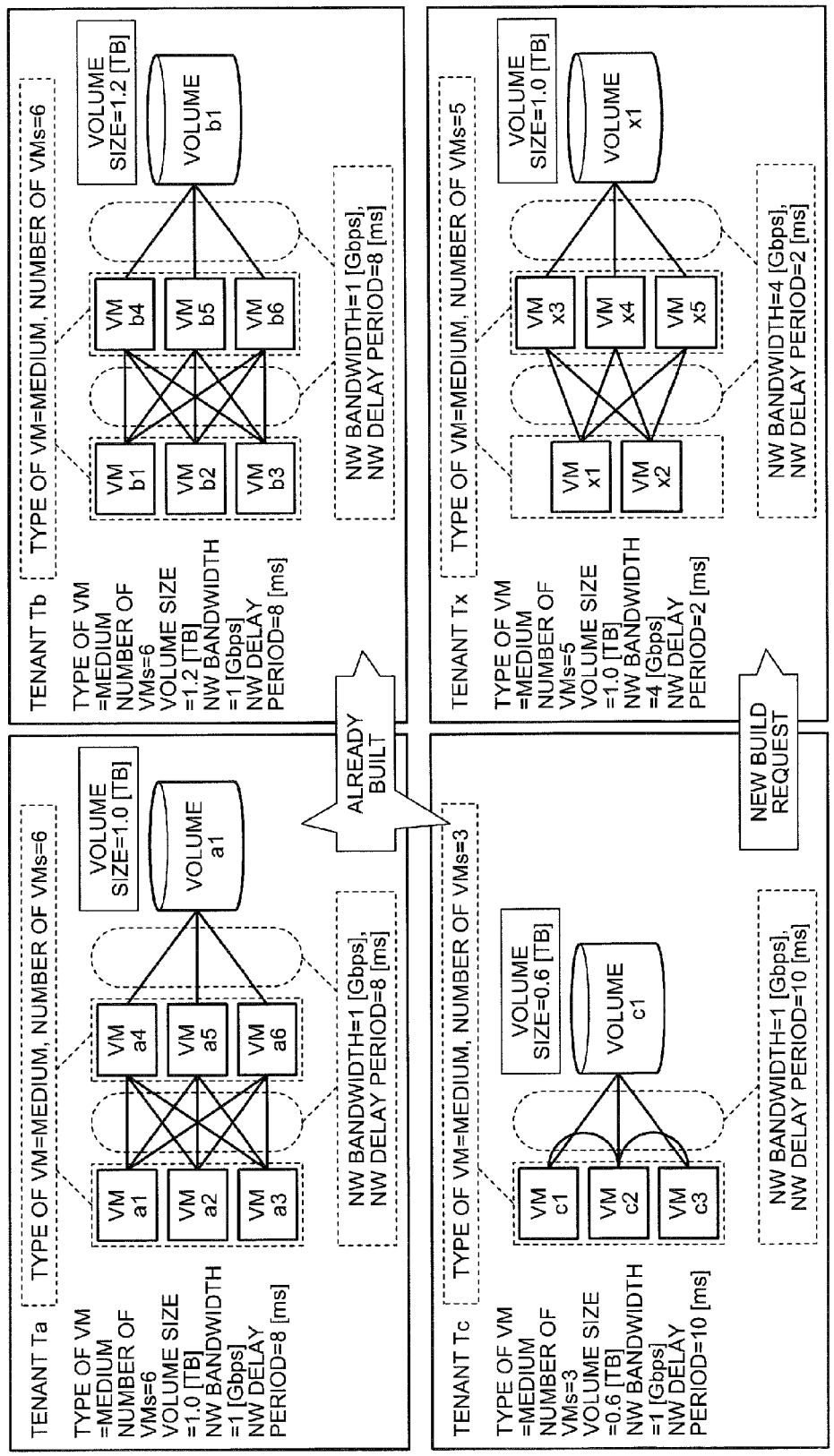
FIG. 10 is an explanatory diagram of an example of the state of each tenant in a case where a new tenant build request is made.

FIG. 10 is an explanatory diagram of an example of the state of each tenant in a case where a new tenant build request is made. FIG. 10 depicts a situation where the cloud system 200 including the already built tenants Ta, Tb, and Tc receives a request for building a new tenant Tx. For simpler explanation, the type of VMs requested by the tenants Ta, Tb, and Tc and the tenant Tx is assumed to be medium. When the type of a VM is medium, the number of CPUs assigned to the VM is 1, the size of a memory assigned to the VM is 1 [GB], and the size of a volume used by the VM is 0.04 [TB].

Performance information requested by the new tenet Tx indicates the number of VMs as 5, a volume size of 1.0 [TB], a NW bandwidth of 4 [Gbps], and a NW delay period of 2 [ms].

Figure 11:
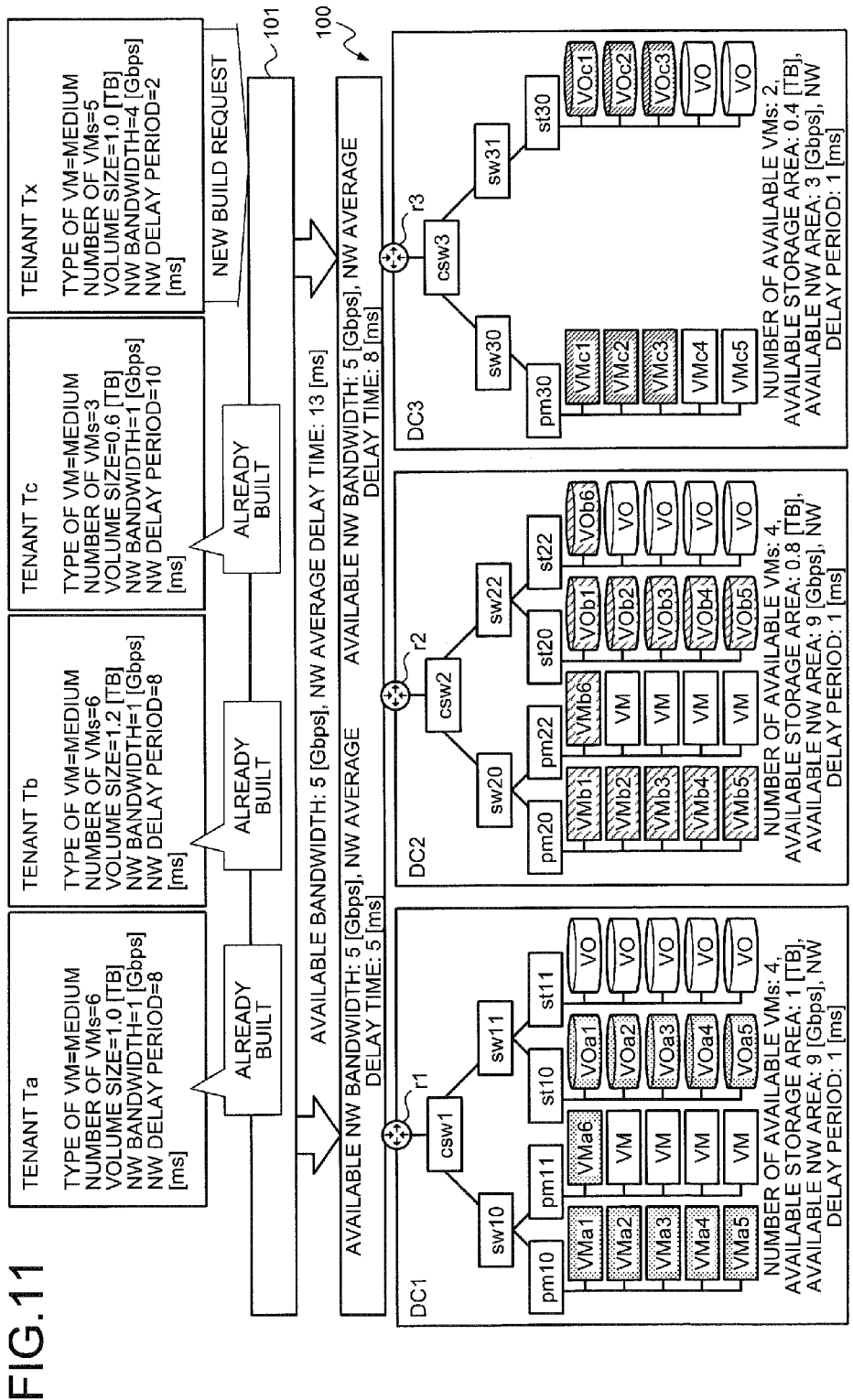
FIG. 11 is an explanatory diagram of an example of the state of the cloud system in a case where a new tenant build request is made.

FIG. 11 is an explanatory diagram of an example of the state of the cloud system in a case where a new tenant build request is made. FIG. 11 depicts the state of available resources in the DC1, DC2, and DC3 included in the cloud system 200. For example, at the DC1, the number of available VMs is 4, an available storage area is 1 [TB], an available NW bandwidth is 9 [Gbps], and a NW delay period is 1 [ms]. An available NW bandwidth between the DC1 and DC2 is 5 [Gbps], and an average delay time between the DC1 and DC2 is 5 [ms]. An available NW bandwidth between the DC1 and DC3 is 5 [Gbps], and an average delay time between the DC1 and DC3 is 13 [ms]. An available NW bandwidth is given by subtracting a NW bandwidth currently in use from a NW bandwidth.

FIG. 12 is an explanatory diagram of an example of selection of a building destination DC in a case where a new tenant build request is made. The resource management apparatus 101 lists DCs as candidates for a Tx building destination DC, and calculates differences between available resources of the candidates for the building destination DC and performance information of the Tenant Tx and also calculates transfer costs. A table 1201 indicates for each candidate for the Tx building destination DC, differences between an available resource of a candidate for the building destination DC and performance information of the Tenant Tx, and a transfer cost.

The table 1201 has five fields including "DC in which tenant is built", "available resources of building destination DC candidate", "Tx performance information", "difference between available resources of building destination DC candidate and Tx performance information", and "transfer cost". The "available resources of building destination DC candidate" field has four subfields including "number of available VMs", "available storage area", "available NW bandwidth", and "total NW delay period". The "Tx performance information" field has four subfields including "number of VMs", "volume size", "NW bandwidth", and "NW delay period". The "difference between available resources of building destination DC candidate and Tx performance information" field has four subfields including "number of VMs", "volume size", "NW bandwidth", and "NW delay period".

The "DC in which tenant is built" field stores therein identification information of a DC that is a candidate for the tenant building destination DC. The "transfer cost" field stores therein the load for transferring a component of a different tenant, the load arising when a tenant is built in a candidate for the building destination DC.

The tenant performance information depicted FIGS. 6 and 10 is stored in each of the four subfields of the "available resources of building destination DC candidate" field and the four subfields of the "Tx performance information" field. Differences between values in the four subfields of the "available resources of building destination DC candidate" field and values in subfields corresponding to the those four subfields among the subfields of the "Tx performance information" are stored in the four subfields of the "difference between available resource of candidate for building destination DC and Tx performance information" field, respectively.

The table 1201 of FIG. 12 has records of 1201-1 to 1201-6. The record 1201-1 indicates a difference between available resources of a candidate for the building destination DC and of Tx performance information and a transfer cost in a case of a candidate for the Tx building destination DC being the DC1. Similarly, the record 1201-2 indicates a case of a candidate for the Tx building destination DC being the DC2, and the record 1201-3 indicates a case of a candidate for the Tx building destination DC being the DC3. The record 1201-4 indicates a case of candidates for the Tx building destination DC being the DC1 and DC2. The record 1201-5 indicates a case of candidates for the Tx building destination DC being the DC1 and DC3. The record 1201-6 indicates a case of candidates for the Tx building destination DC being the DC2 and DC3. Candidates for the Tx building destination DC may be three or more DCs.

A value in each subfield of the "difference between available resource of candidate for the building destination DC and Tx performance information" field is calculated by the following equations.

Number of VMs=number of available VMs−number of VMs determined by *Tx* performance information Volume size=available storage area−volume size determined by *Tx* performance information NW bandwidth=available NW bandwidth−NW bandwidth determined by *Tx* performance information NW delay period=NW delay period determined by *Tx* performance information−total NW delay period An available NW bandwidth for a tenant built by using one DC is equivalent to a NW bandwidth available at the DC, and a total NW delay period for a tenant built by using one DC is equivalent a NW delay period at the DC. An available NW bandwidth and a total NW delay period for a tenant built by using multiple DCs can be calculated by the following equations (1) and (2).

Available NW bandwidth=Min(available NW bandwidth at each DC, available NW bandwidth between DCs) (1)

Total NW delay period=Σ(NW delay period at each DC, average NW delay period between DCs) (2)

In the equations, Min ( ) represents a function for outputting the minimum among arguments. For example, when candidates for the Ta building destination DC are the DC1 and DC2, an available NW bandwidth is calculated in the following manner, using equation (1).

Available NW bandwidth=Min(available NW bandwidth at DC1, available NW bandwidth at DC2, available NW bandwidth between DC1 and DC2)

available bandwidth=Min(9,9,5)=5 [Mbps]

In the same manner, when candidates for the Ta building destination DC are the DC1 and DC2, a total NW delay period is calculated in the following manner, using equation (2).

Total NW delay period=Σ(NW delay period at DC1, NW delay period at DC2, average NW delay period between DC1 and DC2)

Total NW delay period=Σ(1,1,5)=1+1+5=7[ms]

A transfer cost can be calculated by equation (3).

Transfer cost=number of insufficient VMs*(memory size of VM+volume size of VM)+size of insufficient storage (3)

Equation (3) is not the only equation for calculating a transfer cost. Another equation for calculating a transfer cost may be created by adding a third term of "amount of insufficient NW bandwidth" to equation (3). When a transfer cost is calculated, a candidate for the building destination DC having a negative NW delay period is excluded from among the candidates for the building destination. This is because that the NW delay period is greatly affected by distance and is, therefore, not improved significantly even if a component is transferred. The table 1201 indicates that candidates for the building destination DC with negative NW delay periods are the DC1 and DC2, the DC1 and DC3, and the DC2 and DC3. To avoid selecting a candidate for the building destination DC with a negative NW delay period as the building destination DC, for example, the resource management apparatus 101 sets a transfer cost for a candidate for the building destination DC with a negative NW delay period, to infinity.

For example, a transfer cost in the case of a candidate for the Tx building destination DC being the DC1 is calculated in the following manner, using equation (3).

Transfer cost=number of insufficient VMs at DC1* (memory size of VM+volume size of VM)+size of insufficient storage at DC1

Transfer cost=1*(0.001+0.04)+0=0.041

For example, the resource management apparatus 101 selects a candidate for the building destination DC having the lowest transfer cost among the calculated transfer costs, as the Tx building destination DC. In the example of FIG. 12, the resource management apparatus 101 selects the DC1 from among the DC1 to DC3, as the Tx building destination DC. The resource management apparatus 101 then executes a process of selecting a component for transfer from among the components of the tenant Tx that is to be built in the DC1 and a process of selecting a transfer destination DC. An example of selection of a component and an example of selection of a transfer destination DC will be described with reference to FIG. 13.

FIG. 13 is an explanatory diagram of an example of selection of a component for transfer in a case where a new tenant build request is made. The resource management apparatus 101 lists the VMs of the tenant Ta as transfer candidates and determines for each VM, a candidate for a transfer destination DC for the VM, a transfer cost for transfer of the VM, and a communication cost resulting from transfer of the VM. A table 1301 indicates for each VM, a candidate for the transfer destination DC for the VM, a transfer cost for transfer of the VM, and a communication cost resulting from transfer of the VM.

The table 1301 has six fields of "VM candidate for transfer", "candidate for transfer destination DC", "DC in which tenant Ta is built when VM is transferred", "presence/absence of performance information violation cause by VM transfer", "transfer cost", and "cost of communication between DCs after VM transfer". The table 1301 has records 1301-1 to 1301-12.

The "VM candidate for transfer" field stores therein identification information of a VM that is a transfer candidate. The "candidate for a transfer destination DC" field stores therein identification information of a DC that is a transfer destination candidate DC for the VM. The "DC in which tenant Ta is built when VM is transferred" field stores therein identification information of a DC in which the tenant Ta is built when the VM is transferred to the transfer destination candidate DC. The "presence/absence of performance information violation cause by VM transfer" field stores therein an identifier indicative of whether a requirement for performance information of the tenant Ta is satisfied when the VM is transferred to the transfer destination candidate DC. For example, the "presence/absence of performance information violation cause by VM transfer" field stores therein an "absent" identifier indicating that the requirement for performance information of the tenant Ta is satisfied and a "present" identifier indicating that the requirement for performance information of the tenant Ta is not satisfied. The "transfer cost" field stores therein the volume of load required for transfer of the VM. The "cost of communication between DCs after VM transfer" field stores therein the volume of communication load that arises after transfer of the VM.

For example, a value calculated by equation (4) may be stored in the "transfer cost" field.

Transfer cost=number of VMs to be transferred*
(memory size of VM+volume size of VM)+size
of storage to be transferred                    (4)

For example, the record 1301-1 indicates a case where a transfer candidate VM is the Ta·VMa1 and a transfer destination DC is the DC2. The record 1301-1 indicates that as a result of transfer of the Ta·VMa1 to the DC2, the post-transfer tenant Ta is built by using resources of The DC1 and DC2. The record 1301-1 further indicates that the requirement for performance information is satisfied when the VM is transferred to the DC2.

The record 1301-2 indicates a case where a transfer candidate VM is the Ta·VMa1 and a transfer destination DC is the DC3. The record 1301-2 also indicates that as a result of transfer of the Ta·VMa1 to the DC3, the post-transfer tenant Ta is built by using resources of The DC1 and DC3. The record 1301-1 further indicates that the requirement for performance information is not satisfied when the VM is transferred to the DC3. For example, the tenant Ta built by using resources of The DC1 and DC3 has a total NW delay period of 15 [ms], as indicated in the record 1201-5 of FIG. 12, and this total NW delay period does not match the NW delay period of 8 [ms] of the tenant Ta indicated in FIG. 11. In this case, therefore, the requirement for performance information of the tenant Ta is not satisfied.

The record 1301-1 indicates that a transfer cost calculated by equation (4) is 0.041. In the example of FIG. 13, the transfer cost stored in the record 1301-1 is calculated in the following manner.

Transfer cost=number of VMs to be transferred*
(memory size of VM+volume size of VM)+size
of storage to be transferred Transfer cost=1*(0.001+0.04)+0=0.041

The record 1301-1 also indicates a communication cost of 110 [Kpkts]. Kpkts denotes 1000 packets. In the communication cost field, the volume of communications between components in the tenant Ta may be stored, as in the above example. The volume of communications between components in the tenant Ta may be recorded as the volume of communications that are made between components in the tenant Ta in a fixed period. A table 1302 indicates the volume of communications made between components in the tenant Ta during a fixed period, for each VM candidate for transfer. The table 1302 of FIG. 13 has records 1302-1 to 1302-6.

The table 1302 includes two fields of "communication destination of VM candidate for transfer" and "total communication volume". The "communication destination of VM candidate for transfer" field has, for each component in the tenant Ta, each subfield storing therein the volume of communications between the component and a VM that is to be transferred. The "total communication volume" field stores therein the sum of the volume of communications between the components and the VM that is to be transferred.

The record 1301-1 indicates that the sum of the volume of communications between the VMa1 and respective components is 110 [Kpkts].

The resource management apparatus 101 enters values in the "total communication volume" fields of the records 1302-1 to 1302-6, into the "cost of communication between DCs after VM transfer" fields of the records 1301-1, 1301-3, 1301-5, 1301-7, 1301-9, and 1301-11.

Following the description of values in the records 1301-1 to 1301-12, an example of selection of a component that is to be transferred performed by the resource management apparatus 101 will be described. The resource management apparatus 101 refers to the table 1301, selects a record meeting three conditions describe below, and selects a VM entered in the "VM candidate for transfer" field of the selected record, as a VM that is to be transferred. The resource management apparatus 101 also selects a DC entered in the "candidate for a transfer destination DC" field of the selected record, as a transfer destination DC.

A first condition is that a value in the "presence/absence of performance information violation cause by VM transfer" field of the record is "absent". A second condition is that a value in the "transfer cost" field of the record is the minimum among the entire records. A third condition is that a value in the "cost of communication between DCs after VM transfer" field of the record is the minimum among the entire records. When selecting one record according to the first condition, the resource management apparatus 101 selects a VM entered in the "VM candidate for transfer" field of the selected record, as the VM that is to be transferred, and selects a DC entered in the "candidate for a transfer destination DC" field of the selected record, as the transfer destination DC. When selecting multiple records according to the first condition, the resource management apparatus 101 may narrow down the selected records to a single record, using the second and third conditions.

In the example of FIG. 13, the case of one VM being transferred is described. When two or more VMs are to be transferred, the transfer cost is calculated by summing transfer costs for all of the VMs. For example, the transfer cost for a case of transferring the VMa1 and VMa2 to the DC2 is calculated at 0.041+0.041=0.082. When two or more VMs are to be transferred, the communication cost is calculated by summing the communication costs for all of the VMs, and if the VMs are transferred to the same VM, the volume of communications made between VMs is subtracted from the calculated communication cost. For example, when the VMa1 and VMa2 are transferred to the DC2, the communication cost is calculated at 110+220−50−50=230 [Kpkts].

In the example of FIG. 13, the record 1301-1 is selected as the record in which a value in the "presence/absence of performance information violation cause by VM transfer" field is "absent" and each value in the "transfer cost" field and the "cost of communication between DCs after VM transfer" field is the minimum value. Hence the resource management apparatus 101 selects the VMa1 as the VM that is to be transferred and selects the DC2 as the transfer destination DC. A process in a case of transferring the VMa1 to the DC2 will be described, referring to FIGS. 14 and 15.

Figure 14:
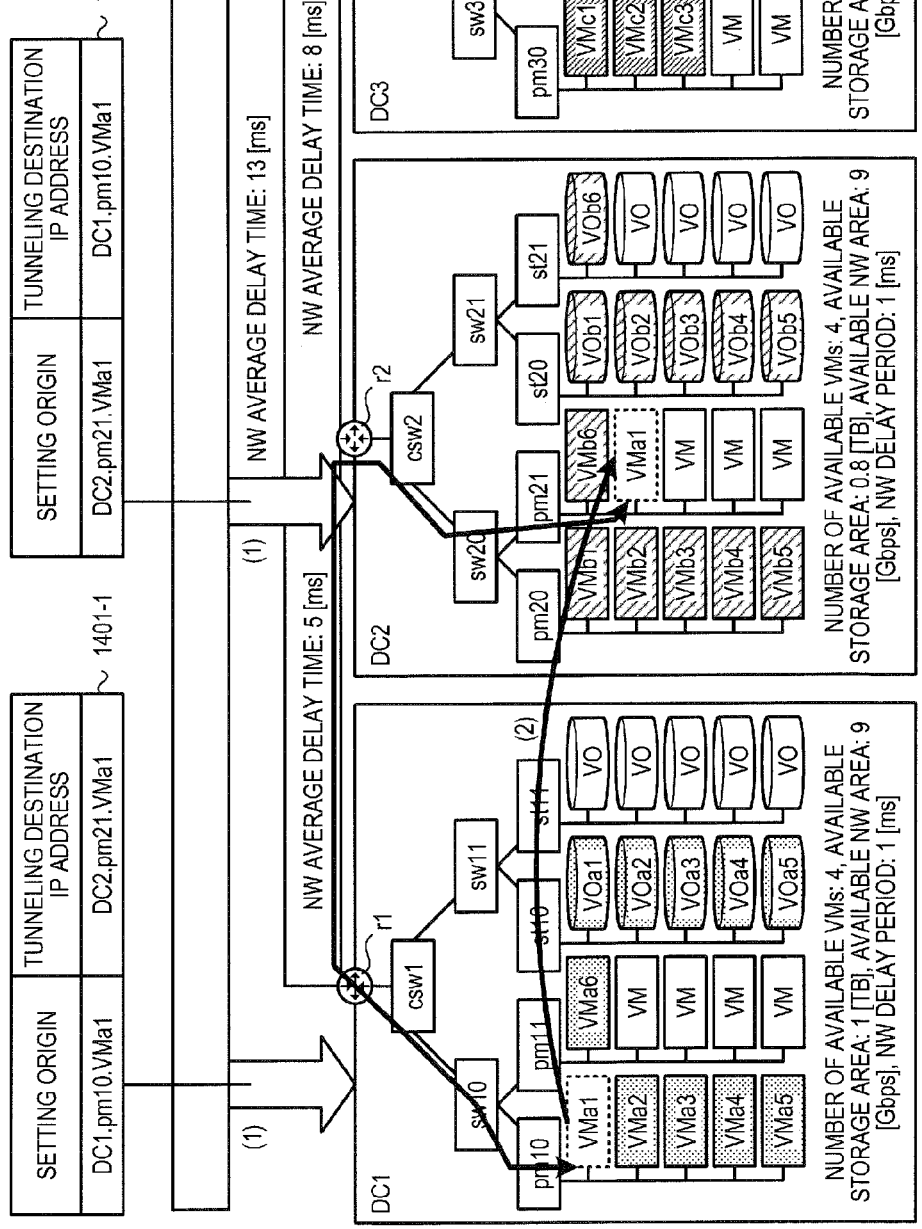
FIG. 14 is an explanatory diagram (1) of an example of a transfer process according to a selection result in a case where a new tenant build request is made.

FIG. 14 is an explanatory diagram (1) of an example of a transfer process according to a selection result in a case where a new tenant build request is made. As a first step, the resource management apparatus 101 makes the tunneling setting information 412 for transfer. For example, the resource management apparatus 101 makes a record 1401-1, as the tunneling setting information 412 for data transfer from a transfer origin component to a transfer destination component. The resource management apparatus 101 also makes a record 1402-1, as the tunneling setting information 412 for data transfer from the transfer destination component to the transfer origin component. After making the records 1401-1 and 1402-1, the resource management apparatus 101 transmits the record 1401-1 and the record 1402-1 to the VMa1 in the physical machine pm10 and the VMa1 in the physical machine pm21, respectively, to cause them to make a tunneling path.

The tunneling setting information 412 of the embodiments includes the addresses of virtual machines for performing tunneling between the virtual machines. When tunneling between virtual machines cannot be performed, the tunneling setting information 412 may include the addresses of physical machines so that tunneling between the physical machines is performed.

As a second step, the resource management apparatus 101 executes transfer of a VM. The resource management apparatus 101 transfers the VMa1, which is a VM that is to be transferred, from the physical machine pm10 in the DC1, which physical machine pm10 is a transfer origin resource, to the physical machine pm21 in the DC2, which physical machine pm21 is a transfer destination resource. After finishing transfer of the VMa1, the resource management apparatus 101 causes the VMa1 in the physical machine pm10 and the VMa1 in the physical machine pm21 to delete the made tunneling path.

Figure 15:
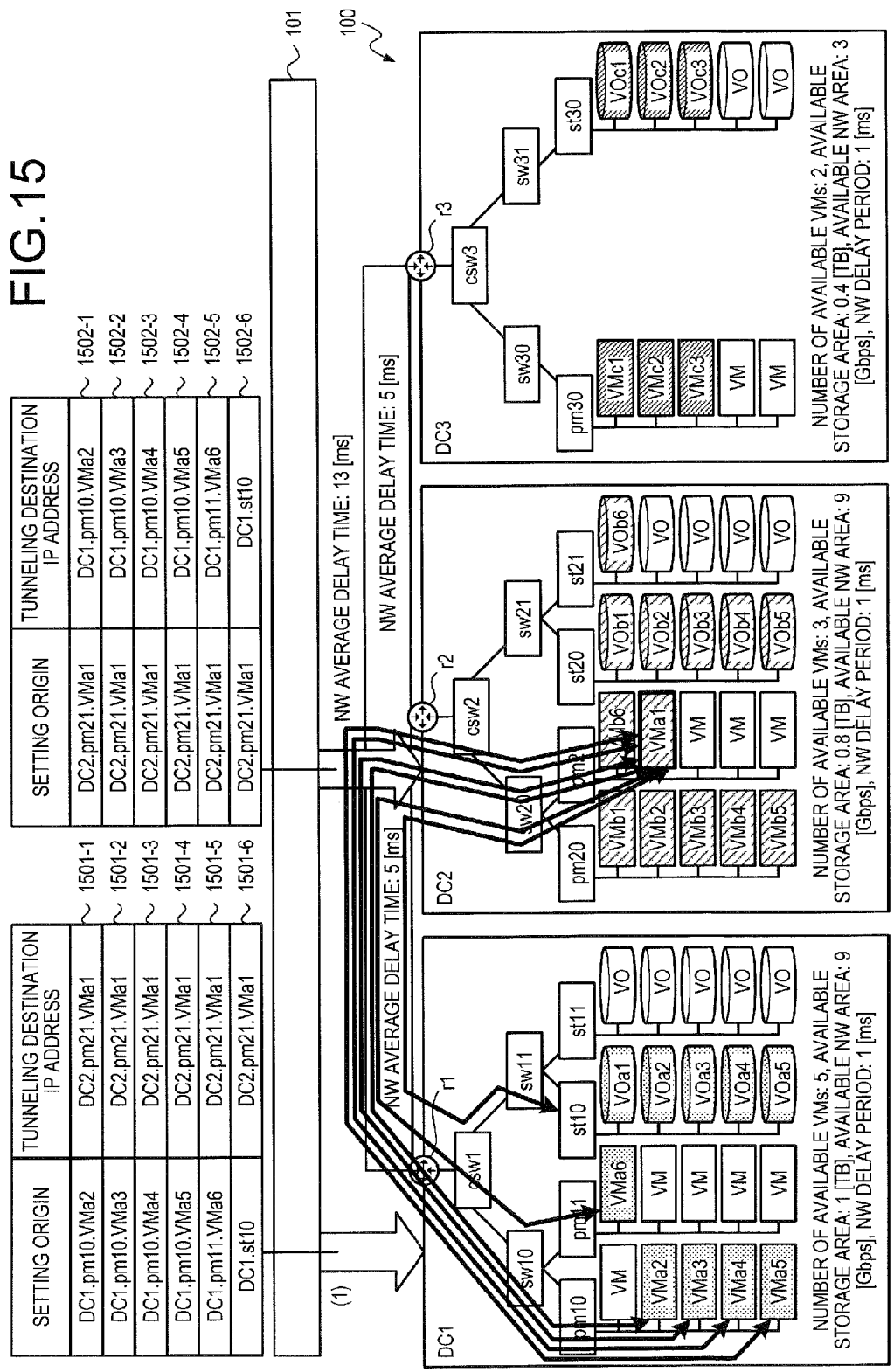
FIG. 15 is an explanatory diagram (2) of an example of a transfer process according to a selection result in a case where a new tenant build request is made.

FIG. 15 is an explanatory diagram (2) of an example of a transfer process according to a selection result in a case where a new tenant build request is made. FIG. 15 depicts a state at the end of transfer of the VMa1. Because the resource management apparatus 101 regards each component in the tenant Ta as the same segment, the resource management apparatus 101 sets tunneling for service for operating the tenant Ta. For example, the resource management apparatus 101 makes records 1501-1 to 1501-6, as the tunneling setting information 412 for service of the tenant Ta from the each component to the transferred VMa1. The resource management apparatus 101 also makes records 1502-1 to 1502-6, as the tunneling setting information 412 for service of the tenant Ta from the transferred VMa1 to each component. After making the records, the resource management apparatus 101 transmits the made records to each component in the corresponding physical machines to cause each component to make a tunneling path.

Figure 16:
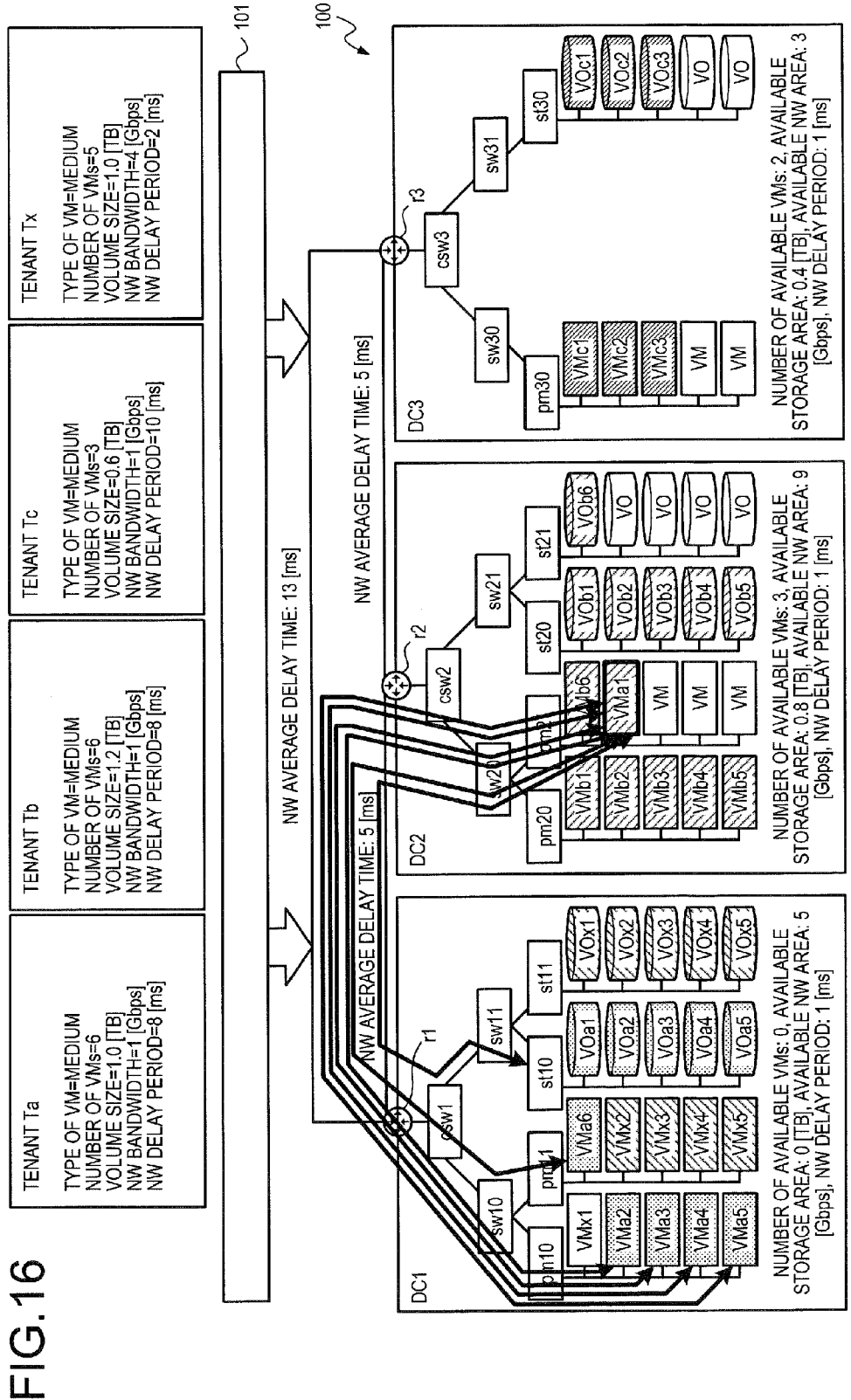
FIG. 16 is an explanatory diagram of a result of a transfer process in a case where a new tenant build request is made.

FIG. 16 is an explanatory diagram of a result of a transfer process in a case where a new tenant build request is made. In FIG. 16, at the DC1, the number of available VMs becomes 0, the available storage area becomes 0 [TB], and the available NW bandwidth becomes 5 [Gbps], which is the bandwidth given by subtracting 4 [Gbps] indicated by the performance information of the Tx from the original bandwidth of 9 [Gbps], as the result of building of the tenant Tx.

A flowchart of a resource arrangement process executed in response to the new tenant build request 221 will be described, referring to FIGS. 17 to 21.

FIG. 17 is a flowchart of an example of a resource arrangement procedure in a case where a new tenant build request is made. The resource arrangement process in the case where a new tenant build request is made is the process of arranging a resource for a new tenant by selecting the resource from multiple DCs in response to the new tenant build request 221.

The resource management apparatus 101 executes a building destination DC selecting process (step S1701). The details of the building destination DC selection process will be described later with reference to FIG. 18. The resource management apparatus 101 then determines whether to transfer a component of an already built tenant (step S1702). Whether to transfer a component of an already built tenant can be determined based on the value of a transfer cost for a building destination DC selected by the building destination DC selecting process. For example, a transfer cost value larger than 0 means that a new tenant cannot be built unless any component is transferred, and a transfer cost value of 0 means that a new tenant can be built without transferring a component.

When transferring a component of an already built tenant (step S1702: YES), the resource management apparatus 101 executes a process of selecting a component that is to be transferred (step S1703). The details of the process of selecting a component that is to be transferred will be described later with reference to FIG. 19.

After executing step S1703 or when not transferring a component of an already built tenant (step S1702: NO), the resource management apparatus 101 determines whether a component that is to be transferred is present (step S1704). If a component that is to be transferred is present (step S1704: YES), the resource management apparatus 101 executes a component transfer instruction process (step S1705). The details of the component transfer instruction process will be described later with reference to FIG. 20.

After executing step S1705 or if a component that is to be transferred is not present (step S1704: NO), the resource management apparatus 101 determines whether a new tenant is present (step S1706). When a new tenant is present (step S1706: YES), the resource management apparatus 101 executes a new tenant building instruction process (step S1707). The details of the new tenant building instruction process will be described later with reference to FIG. 21. After executing step S1707 or a new tenant is not present (step S1706: NO), the resource management apparatus 101 ends the resource arrangement process in the case where a new tenant build request is made. By executing the resource arrangement process in the case where a new tenant build request is made, when a new tenant cannot be built in one DC, the cloud system 200 can build the new tenant by transferring a component of an already built tenant.

FIG. 18 is a flowchart of an example of a procedure of a building destination DC selection process. The building destination DC selection process is the process of selecting a DC in which a new tenant is built, out of multiple DCs. The resource management apparatus 101 makes a list of candidates for a building destination DC for a new tenant (step S1801). The operation at step S1801 is described with reference to the example of FIG. 12, as the process of acquiring the identification information of DCs entered in the "DC in which a tenant is built" field of the table 1201.

The resource management apparatus 101 then calculates a transfer cost for transfer of a component of an already built tenant resulting from building of a tenant, for each candidate for the building destination DC (step S1802). Subsequently, the resource management apparatus 101 selects a candidate for the building destination DC that minimizes the transfer cost (step S1803). After finishing step S1803, the resource management apparatus 101 ends the building destination DC selection process. By executing the building destination DC selection process, the cloud system 200 can select a DC in which a new tenant is built.

FIG. 19 is a flowchart of an example of a procedure of the process of selecting a component that is to be transferred. The process of selecting a component that is to be transferred is a process of selecting from among components making up a tenant, a component that is to be transferred. The resource management apparatus 101 makes a list of combinations of component candidates for transfer and candidates for a transfer destination DC (step S1901). The operation at step S1901 is described with reference to the example of FIG. 13, as a process of making a combination of the identification information of VMs entered in the "VM candidate for transfer" field and the identification information of DCs entered in the "candidate for a transfer destination DC" field.

The resource management apparatus 101 then determines for a combination of a component candidate for transfer and a candidate for the transfer destination DC, the presence/absence of a violation of performance information of a tenant built by using the component candidate for transfer (step S1902). Subsequently, the resource management apparatus 101 selects from among the combinations of component candidates for transfer and candidates for the transfer destination DC, a combination that minimizes the transfer cost (step S1903). The resource management apparatus 101 then selects from among combinations that minimize the transfer cost, a combination that minimizes the cost of communications between DCs (step S1904). After finishing the operation at step S1904, the resource management apparatus 101 ends the process of selecting a component that is to be transferred. By executing the process of selecting a component that is to be transferred, the cloud system 200 can select a component requiring less load for transfer and less volume of post-transfer communications between DCs.

FIG. 20 is a flowchart of an example of a procedure of the component transfer instruction process. The component transfer instruction process is a process of issuing an instruction to transfer a component. The resource management apparatus 101 makes the tunneling setting information 412 for transfer and issues an instruction to set a tunneling path for transfer, to a physical machine serving as a transfer origin of the component that is to be transferred and to a physical machine serving as a transfer destination of the component (step S2001). The resource management apparatus 101 then issues an instruction to transfer the component, to the physical machine serving as the transfer origin and to the physical machine serving as the transfer destination (step S2002). The resource management apparatus 101 then issues an instruction to delete the tunneling path for transfer, to the physical machine serving as the transfer origin and to the physical machine serving as the transfer destination (step S2003). The resource management apparatus 101 then issues an instruction to make a tunneling path for service of a tenant, to each component of a tenant having the component that is to be transferred (step S2004). After ending step S2004, the resource management apparatus 101 ends the component transfer instruction process.

By executing the process of issuing an instruction to transfer a component of an already built tenant, the cloud system 200 sets a tunneling path for transfer on a tenant built across multiple DCs and regards the tenant as the same segment to transfer a component. The cloud system 200 sets a tunneling path for service and regards the tenant as the same segment to provide the tenant to the user.

FIG. 21 is a flowchart of an example of a procedure of the new tenant building instruction process. The new tenant building instruction process is a process of issuing an instruction to build a new tenant, to a physical machine or a component. The resource management apparatus 101 issues a resource arrangement instruction to a physical machine (step S2101). For example, the physical machine selects a resource that realizes a component used for building the new tenant, from among available resources and secures the selected resource.

The resource management apparatus 101 then determines whether the new tenant is built across multiple DCs (step S2102). If the new tenant is built across multiple DCs (step S2102: YES), the resource management apparatus 101 issues to each component of the new tenant, an instruction to make a tunneling path for service of the new tenant (step S2103). After finishing step S2103 or if the new tenant is not built across multiple DCs (step S2102: NO), the resource management apparatus 101 ends the new tenant building instruction process.

An operation of the cloud system 200 in a case where an operation policy setting request is made will be described with reference to FIGS. 22 to 29.

FIG. 22 is an explanatory diagram of an example of the state of the cloud system in a case where an operation policy setting request is made. The state of the cloud system 200 depicted in FIG. 22 is the same as the state of the cloud system 200 depicted in FIG. 16. It is assumed in this state, to maintain the physical machine pm30, the administrator terminal 212 issues a physical machine maintenance request (DC3, pm30) as a change in operation policy. The state according to the operation policy will be described with reference to FIG. 23.

Figure 23:
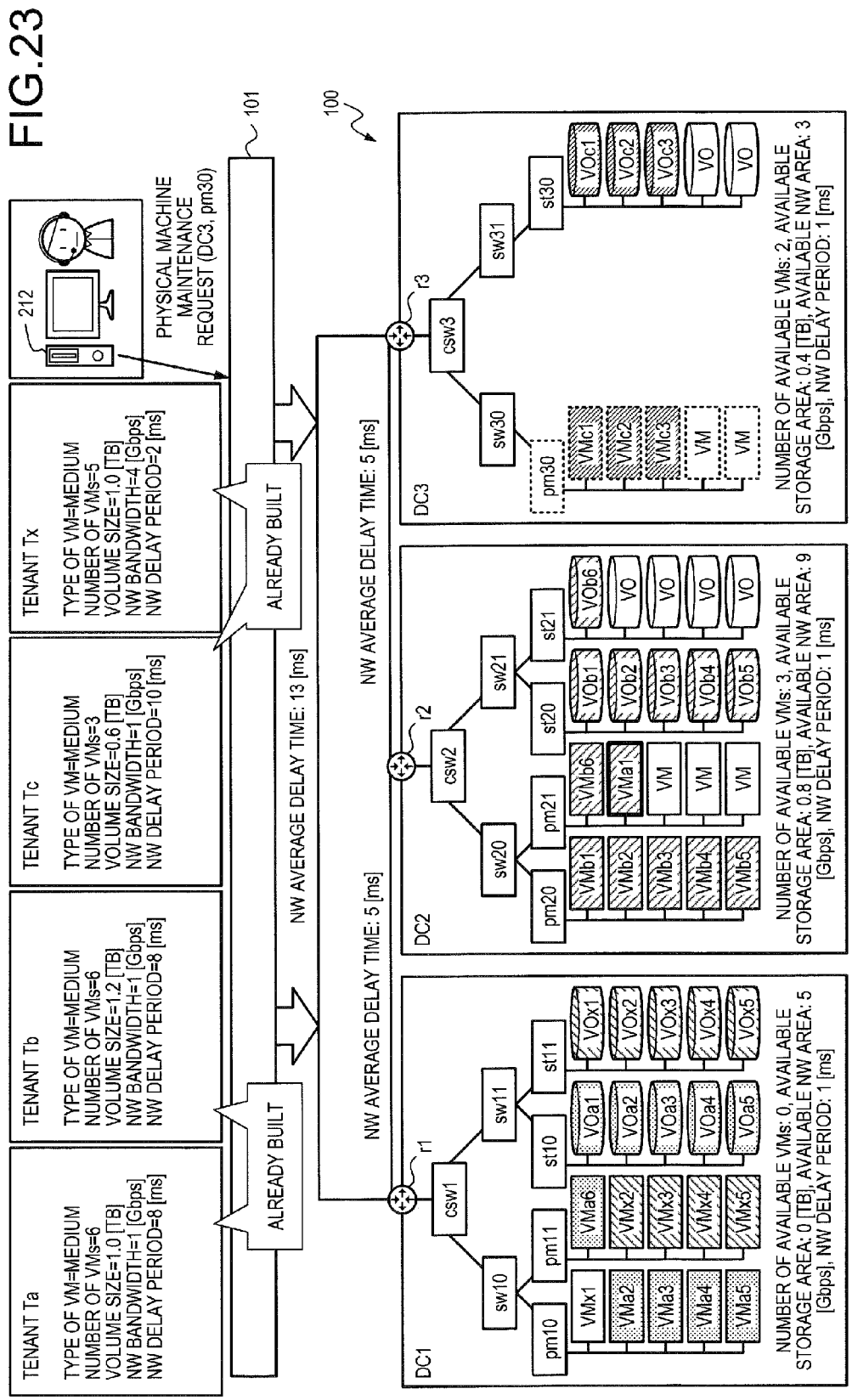
FIG. 23 is an explanatory diagram of a state reflecting a change in operation policy in a case where an operation policy setting request is made.

FIG. 23 is an explanatory diagram of a state reflecting a change in operation policy in a case where an operation policy setting request is made. Receiving a physical machine maintenance request (DC3, pm30), the resource management apparatus 101 excludes the physical machine pm30 as a tenant building destination by following the operation policy. As a result, the cloud system 200 selects the VMc1, VMc2, and VMc3 of the tenant Tc, as components that are to be transferred and transfers the components to a DC different from the DC3. The VMc1, VMc2, and VMc3 are components implemented by using resources of the physical machine pm30. An example of selection of a transfer destination DC for a component that is to be transferred is described with reference to FIG. 24.

FIG. 24 is an explanatory diagram of an example of selection of a transfer destination DC for a tenant in a case where an operation policy setting request is made. The resource management apparatus 101 lists DCs that are candidates for a transfer destination DC for a component that is to be transferred, and calculates differences between available resources of candidates for the transfer destination DC and Tc performance information, and also calculates transfer costs. A table 2401 indicates a difference between available resources of a candidate for the transfer destination DC and Tc performance information and a transfer cost, for each transfer destination DC candidate for the component that is to be transferred. In fields of the table 2401, "building destination DC" and "Tx" entered in the table 1201 are replaced with "transfer destination DC" and "Tc", respectively. Description of each field of the table 2401 is therefore omitted. Because the "difference between available resources of a candidate for the transfer destination DC and Tc performance information" field is the result of replacement of "Tx" with "Tc", description of a method of calculating each filed of the "difference between available resources of a candidate for the transfer destination DC and Tc performance information" field is also omitted. The table 2401 of FIG. 24 has records 2401 to 2401-3.

In the example of FIG. 24, the resource management apparatus 101 selects the DC2 that minimizes the transfer cost, as a building destination for the tenant Tc. An example of a process of transferring each component of the DC2 will be described with reference to FIGS. 25 and 26.

FIG. 25 is an explanatory diagram (1) of an example of a transfer process executed according to a selection result in a case where an operation policy setting request is made. As a first step, the resource management apparatus 101 makes the tunneling setting information 412 for transfer. For example, the resource management apparatus 101 makes records 2501-1 to 2501-3, as the tunneling setting information 412 for data transfer from a transfer origin component to a transfer destination component. The resource management apparatus 101 also makes records 2502-1 to 2502-3, as the tunneling setting information 412 for data transfer from the transfer destination component to the transfer origin component. The resource management apparatus 101 then transmits the records 2501-1 to 2501-3 and the records 2502-1 to 2502-3, to the VMc1 to VMc3 in the physical machine pm30 and the VMc1 to VMc3 in the physical machine pm21, respectively, to cause the VMs to make a tunneling path.

As a second step, the resource management apparatus 101 executes transfer of a VM. The resource management apparatus 101 transfers the virtual machines VMc1 to VMc3 (VMs that are to be transferred), from the physical machine pm30 (transfer origin resource) in the DC3, to the physical machine pm21 (transfer destination resource) in the DC2. After finishing transfer of the VMs, the resource management apparatus 101 causes the VMc1 to VMc3 in the physical machine pm30 and the VMc1 to VMc3 in the physical machine pm21 to delete the tunneling path.

Figure 26:
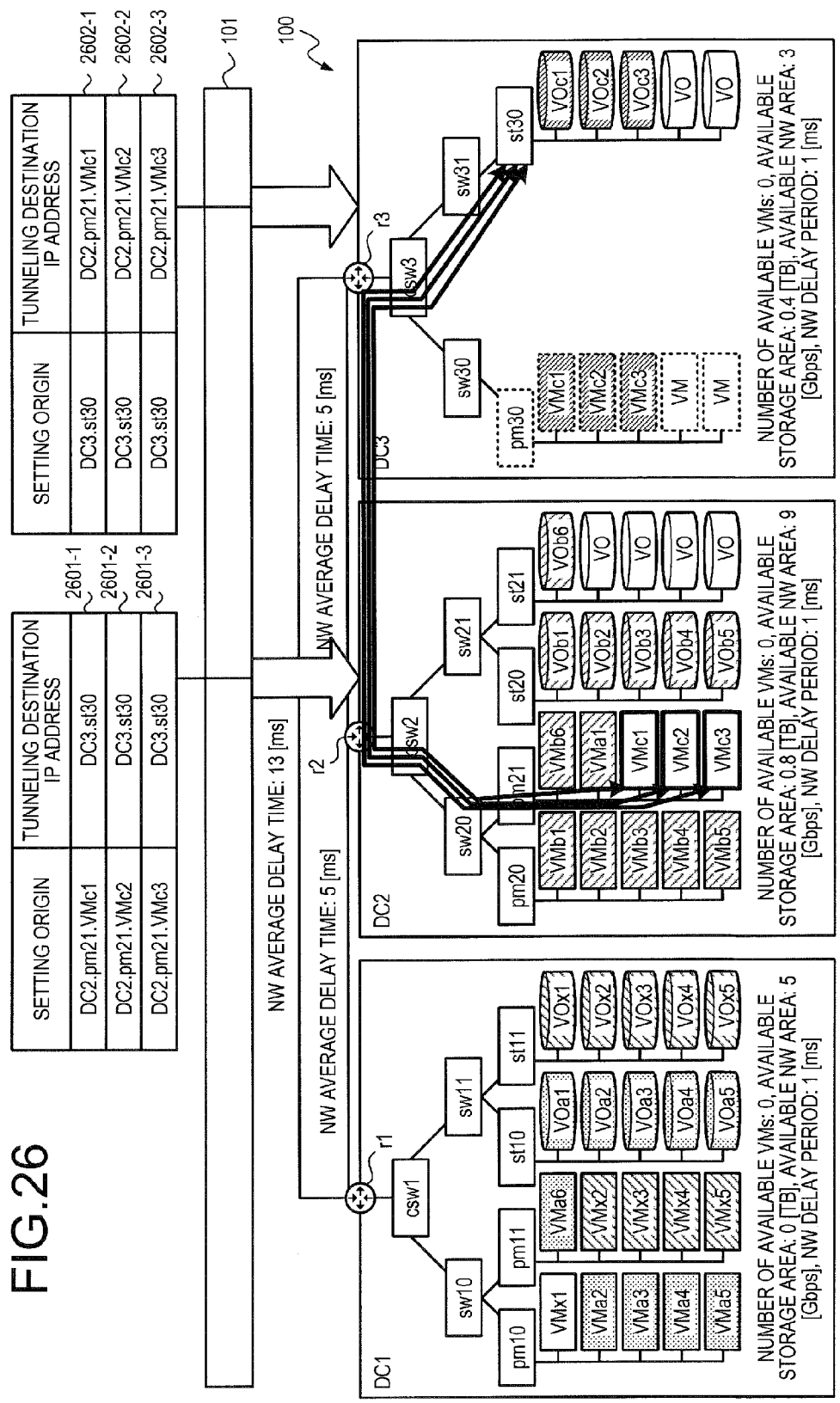
FIG. 26 is an explanatory diagram (2) of an example of a transfer process executed according to a selection result in a case where a new tenant build request is made.

FIG. 26 is an explanatory diagram (2) of an example of a transfer process executed according to a selection result in a case where a new tenant build request is made. FIG. 26 depicts a state at the end of transfer of the VMc1 to VMc3. Because the resource management apparatus 101 regards each component in the tenant Tc as the same segment, the resource management apparatus 101 sets a tunneling path for service for operating the tenant Tc. For example, the resource management apparatus 101 makes records 2601-1 to 2601-3, as the tunneling setting information 412 for service of the tenant Tc from the transferred VMc1 to VMc3 to the storage device st30. The resource management apparatus 101 also makes records 2602-1 to 2602-6, as the tunneling setting information 412 for service of the tenant Ta from the storage device st30 to the transferred VMc1 to VMc3. After making the records, the resource management apparatus 101 transmits the records to each component in the corresponding physical machines to cause each component to make a tunneling path.

Figure 27:
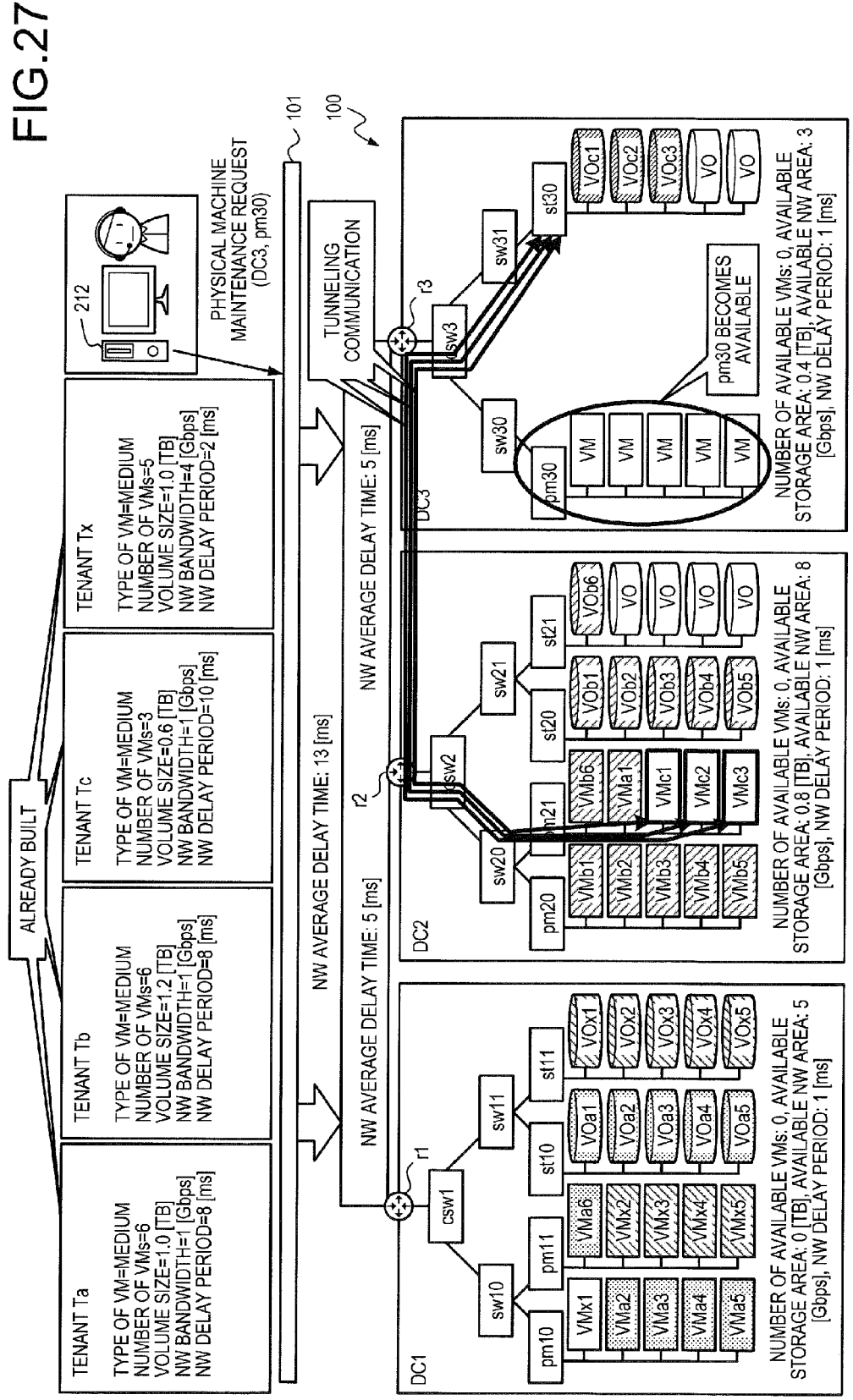
FIG. 27 is an explanatory diagram of a result of a transfer process in a case where an operation policy setting request is made.

FIG. 27 is an explanatory diagram of a result of a transfer process in a case where an operation policy setting request is made. In FIG. 27, at the DC2, the number of available VMs becomes 0, and the available NW bandwidth becomes 8 [Gbps], which is the bandwidth given by subtracting 1 [Gbps] indicated by the performance information of the Tb from the original bandwidth of 9 [Gbps], as the result of building of the tenant Tc using resources of the DC.

A flowchart of a resource arrangement process executed in response to the operation policy setting request 222 will be described.

FIG. 28 is a flowchart of an example of a procedure of the resource arrangement process in a case where an operation policy setting request is made. The resource arrangement process in a case where an operation policy setting request is made is a process of arranging a resource for a component that is to be transferred according to an applied operation policy in response to the operation policy setting request 222. Steps S2804 to S2807 of FIG. 28 are the same as steps S1702 to S1705, and are therefore omitted in further description.

The resource management apparatus 101 executes a process of operation policy application (step S2801). The details of the process of operation policy application will be described later with reference to FIG. 29. The resource management apparatus 101 then determines whether a component that is to be transferred has been selected as a result of application of an operation policy (step S2802). When a component that is to be transferred is selected (step S2802: YES), the resource management apparatus 101 executes a transfer destination DC selection process (step S2803). The contents of this transfer destination DC selection process are almost identical with the contents of the building destination DC selection process of FIG. 18, and are therefore not depicted. The transfer destination DC selection process is different from the building destination DC selection process in that "candidate for the building destination DC" is replaced with "candidate for the transfer destination DC" and that "component of an already built tenant" at step S1802 is replaced with "component of an already built tenant other than a tenant built by using a component that is to be transferred". After finishing executing step S2803, the resource management apparatus 101 proceeds to step S2804.

If a component that is to be transferred has not been selected (step S2802: NO), the resource management apparatus 101 ends the resource arrangement process in the case where an operation policy setting request is made. As a result of execution of the resource arrangement process in the case where an operation policy setting request is made, an available resource is arranged for a component having become incapable of using a resource because of an applied operation policy and the component can be transferred.

FIG. 29 is a flowchart of an example of a procedure of a process of operation policy application. The process of operation policy application is a process of applying an operation policy to the cloud system 200. The resource management apparatus 101 checks a resource specified by the operation policy (step S2901). The resource management apparatus 101 then applies the contents of changes to the specified resource (step S2902). Subsequently, the resource management apparatus 101 determines whether a component implemented by using a resource excluded from a tenant building destination is present (step S2903).

If a component implemented by using a resource excluded from the tenant building destination is present (step S2903: YES), the resource management apparatus 101 selects the component implemented by using the excluded resource, as a component that is to be transferred (step S2904). After finishing step S2904 or if a component implemented by using a resource excluded from the tenant building destination is not present (step S2903: NO), the resource management apparatus 101 ends the process of operation policy application.

As described above, according to the resource management apparatus 101, when a new tenant cannot be built in the first DC, if a requirement for performance information of an already built system is satisfied when a component implemented by using a resource of the first DC is transferred from the first DC to the second DC, the component is transferred. As a result, the resource management apparatus 101 can build a new tenant meeting demands from the user by using an available resource created as a result of component transfer. Thus, the resource management apparatus 101 can effectively use available resources of the DC.

The resource management apparatus 101 determines whether a requirement for performance information of an already built system is satisfied when the first component or second component implemented by using a resource of the first DC is transferred from the first DC to the second DC. If determining that the requirement for performance information of the already built system is satisfied, the resource management apparatus 101 may calculate the volume of transfer load for transferring the first component or second component and based on the calculated volume of transfer load, select a component that is to be transferred, from among the first and second components. Through this process, the resource management apparatus 101 can build a new tenant meeting demands from the user and transfer a component requiring less transfer load.

The resource management apparatus 101 determines whether a requirement for performance information is satisfied when a component that is to be transferred is transferred to the third DC different from the second DC. When determining that the requirement for performance information of is satisfied when the component that is to be transferred is transferred to the third DC, the resource management apparatus 101 may calculate the volume of load required for a process of transferring the component that is to be transferred to the third DC and based on the calculated volume of load, select a transfer destination DC from among the second and third DCs. Through this process, the resource management apparatus 101 can build a new tenant meeting the demands of the user and transfer a component for which the transfer load is lower to a DC for which the transfer load is lower.

The resource management apparatus 101 calculates the volume of communications made between the first DC and the second DC after transfer of the first component to the second DC and the volume of communications made between the first DC and the second DC after transfer of the second component to the second DC. Based on the calculated volume of communications, the resource management apparatus 101 may select a component that is to be transferred, from among the first and second components. Through this process, the resource management apparatus 101 can build a new tenant meeting demands of the user and transfer a component causing less post-transfer communications.

The resource management apparatus 101 determines whether a requirement for performance information is satisfied when a component is transferred to the third DC different from the second DC. If determining that the requirement for performance information of is satisfied when the component is transferred to the third DC, the resource management apparatus 101 may calculate the volume of load required for a process of transferring the component to the third DC and based on the calculated volume of load, select a transfer destination DC from among the second and third DCs. Through this process, the resource management apparatus 101 can build a new tenant meeting the demands of the user and transfer a component to a DC for which the transfer load is lower.

The resource management apparatus 101 determines whether a requirement for performance information is satisfied when a component or another component different from the component is transferred to a transfer destination DC. When determining that the requirement for performance information is satisfied when the component or the other component is transferred to the transfer destination DC, the resource management apparatus 101 may calculate the volume of load required for a process of transferring the other component to the transfer destination DC and based on the calculated volume of load, select a component that is to be transferred, from among the component and the other component. Through this process, the resource management apparatus 101 can build a new tenant meeting the demands of the user and transfer a component to a DC requiring less transfer load.

The resource management method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

According to an aspect of the present invention, an effect is achieved such that a system can be built by effectively using the resources of a date center.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A resource management system comprising:
a memory unit that stores therein performance information of a system; and
a processor configured to:
refer to the performance information and determine whether a requirement for first performance information corresponding to a first system is satisfied when a function of the first system, originally implemented by using a resource of a first data center, is implemented by using a resource of a second data center,
implement the function by using a resource of the second data center, upon determining that the requirement for the first performance information is satisfied, and thereby build a configured system satisfying the requirement for the first performance information by using the resource of the first data center and the resource of the second data center,
calculate upon determining that the requirement for the first performance information is satisfied when a first component that is implemented by using the resource of the first data center is transferred to the second data center or third data center, load for a process of transferring the first component to the second data center and load for a process of transferring the first component to the third data center,
select based the calculated loads and select from among the second and third data centers, a transfer destination data center to which the first component is transferred, and
implement the first component, using a resource of the selected transfer destination data center, to thereby build the configured system satisfying the requirement for the first performance information by using the resource of the first data center and the resource of the transfer destination data center.

2. The resource management system according to claim 1, the processor further configured to:
calculate upon determining that the requirement for the first performance information is satisfied when a first component or a second component implemented by using the resource of the first data center is transferred to the second data center, load for a process of transferring the first component to the second data center and load for a process of transferring the second component to the second data center, and select based on the calculated loads and select from among the first and second components, a component that is to be transferred from the first data center to the second data center, wherein the processor implements the selected component using the resource of the second data center, and thereby builds the configured system satisfying the requirement for the first performance information by using the resource of the first data center and a resource of the second data center.

3. The resource management system according to claim 2, wherein the processor upon determining that the requirement for the first performance information is satisfied when the selected component is transferred to a third data center different from the second data center, calculates the load for the process of transferring the selected component to the third data center, the processor further configured to select based on the calculated load for the process of transferring the selected component to the third data center and select from among the second and third data centers, a transfer destination data center for the selected component, and the processor implements the selected component, using a resource of the selected transfer destination data center, and thereby builds the configured system satisfying the requirement for the first performance information by using the resource of the first data center and the resource of the transfer destination data center.

4. The resource management system according to claim 2, wherein the memory unit stores therein a volume of communications made between multiple components, the processor based on the volume of communications, calculates a volume of communications made between the first data center and the second data center after transfer of the first component to the second data center and a volume of communications made between the first data center and the second data center after transfer of the second component to the second data center, the processor selects based on the calculated volumes of communications and selects from among the first and second components, the component to be transferred from the first data center to the second data center.

5. The resource management system according to claim 1, wherein the processor upon determining that the requirement for the first performance information is satisfied when a second component that is different from the first component implemented by using the resource of the first data center is transferred to the transfer destination data center, calculates load for a process of transferring the second component to the transfer destination data center, the processor selects from among the first component and the second component and selects based on the calculated load for a process of transferring the second component to the transfer destination data center, the component to be transferred to the transfer destination data center, and the processor implements the selected component using a resource of the transfer destination data center, and thereby builds the configured system satisfying the requirement for the first performance information by using the resource of the first data center the a resource of the transfer destination data center.

6. A resource management method executed by a computer, the resource management method comprising:

referring to performance information and determining whether a requirement for first performance information corresponding to a first system is satisfied when a function of the first system, originally implemented by using a resource of a first data center, is implemented by using a resource of a second data center, implementing the function by using a resource of the second data center, when at the determining, the requirement for the first performance information is determined to be satisfied, and thereby building a configured system satisfying the requirement for the first performance information by using the resource of the first data center and the resource of the second data center, calculating upon determining that the requirement for the first performance information is satisfied when a first component that is implemented by using the resource of the first data center is transferred to the second data center or third data center, load for a process of transferring the first component to the second data center and load for a process of transferring the first component to the third data center, selecting based the calculated loads and select from among the second and third data centers, a transfer destination data center to which the first component is transferred, and implementing the first component, using a resource of the selected transfer destination data center, to thereby build the configured system satisfying the requirement for the first performance information by using the resource of the first data center and the resource of the transfer destination data center.

7. A non-transitory computer-readable recording medium storing a resource management program that causes a computer to execute a process comprising:

referring to performance information and determining whether a requirement for first performance information corresponding to a first system is satisfied when a function of the first system, originally implemented by using a resource of a first data center, is implemented by using a resource of a second data center, implementing the function by using a resource of the second data center, when at the determining, the requirement for the first performance information is determined to be satisfied, and thereby building a configured system satisfying the requirement for the first performance information by using the resource of the first data center and the resource of the second data center, calculating upon determining that the requirement for the first performance information is satisfied when a first component that is implemented by using the resource of the first data center is transferred to the second data center or third data center, load for a process of transferring the first component to the second data center and load for a process of transferring the first component to the third data center, selecting based the calculated loads and select from among the second and third data centers, a transfer destination data center to which the first component is transferred, and implementing the first component, using a resource of the selected transfer destination data center, to thereby build the configured system satisfying the requirement for the first performance information by using the resource of the first data center and the resource of the transfer destination data center.

* * * * *